US009632666B2

(12) United States Patent
Goldman-Shenhar et al.

(10) Patent No.: US 9,632,666 B2
(45) Date of Patent: Apr. 25, 2017

(54) TEAM-ORIENTED HVAC SYSTEM

(71) Applicant: GM GLOBAL TECHNOLOGY OPERATIONS LLC, Detroit, MI (US)

(72) Inventors: Claudia V. Goldman-Shenhar, Mevasseret Zion (IL); Asaf Degani, Raanana (IL); Omer Tsimhoni, Herzliya (IL); Christopher T. Thibodeau, Plymouth, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 491 days.

(21) Appl. No.: 13/768,454

(22) Filed: Feb. 15, 2013

(65) Prior Publication Data

US 2013/0219293 A1    Aug. 22, 2013

Related U.S. Application Data

(60) Provisional application No. 61/599,521, filed on Feb. 16, 2012.

(51) Int. Cl.
*G06Q 10/06* (2012.01)
*G06Q 10/10* (2012.01)
(Continued)

(52) U.S. Cl.
CPC ....... *G06F 3/0484* (2013.01); *B60H 1/00742* (2013.01); *B60H 1/00757* (2013.01)

(58) Field of Classification Search
CPC .......... G06Q 10/06; G06Q 10/10; B06H 1/00; B06H 1/007; G06F 3/0484
(Continued)

(56) References Cited

U.S. PATENT DOCUMENTS 5,014,200 A    5/1991   Chundrlik et al.
6,116,369 A    9/2000   King et al.
(Continued)

FOREIGN PATENT DOCUMENTS

EP    1375235        2/2004
GB    2384062        7/2013
KR    10-0821147     4/2008

OTHER PUBLICATIONS

AUVSI 2012—The First International Conference on Unmanned Systems in Israel, Abstract Book, Mar. 20-22, 2012.

*Primary Examiner* — Nga B Nguyen
(74) *Attorney, Agent, or Firm* — Mickki D. Murray, Esq.; Parks IP Law LLC

(57) ABSTRACT

A team-oriented heating, ventilation, and air-conditioning system, for use in support of operations of a vehicle. The system includes instructions that cause a processor to perform operations including communicating, to a human user, via a vehicle-user interface, a request to participate regularly, actively, and collaboratively as a member of a collaborative HVAC team, to include the system, in an ongoing team relationship of cooperation regarding operating the team-oriented HVAC system over time. The operations further include providing, to the user, a commitment communication advising the user that the system will be dedicated to participating regularly, actively, and collaboratively as a team member. The operations also include receiving, from the user, an agreement communication to participate as a member of the collaborative HVAC team. And the operations include forming, responsive to receiving the agreement communication, the collaborative HVAC team including the user and team-oriented HVAC system.

25 Claims, 7 Drawing Sheets

(51) Int. Cl.
  *G06F 3/0484* (2013.01)
  *B60H 1/00* (2006.01)
(58) Field of Classification Search
  USPC .................................. 705/7, 8, 9, 7.13, 7.14
  See application file for complete search history.

(56) References Cited

U.S. PATENT DOCUMENTS

| | | | |
|---|---|---|---|
| 6,374,173 | B1 | 4/2002 | Ehlbeck |
| 6,941,215 | B2 | 9/2005 | Hellmann et al. |
| 8,024,102 | B2 | 9/2011 | Swoboda et al. |
| 2004/0065101 | A1* | 4/2004 | Krupp ................ B60H 1/00478 62/244 |
| 2007/0114292 | A1* | 5/2007 | Breed ................ B60H 1/00742 236/49.3 |
| 2008/0211779 | A1* | 9/2008 | Pryor ........................... 345/173 |
| 2009/0039170 | A1* | 2/2009 | Burns ................ B60H 1/00785 236/44 A |
| 2009/0055178 | A1* | 2/2009 | Coon ................ B60R 16/0373 704/246 |
| 2009/0248244 | A1* | 10/2009 | Sumimoto ......... B60H 1/00735 701/36 |
| 2011/0071725 | A1* | 3/2011 | Kleve et al. ..................... 701/33 |
| 2012/0078440 | A1* | 3/2012 | Oravis ..................... B60R 1/00 701/1 |
| 2012/0089299 | A1* | 4/2012 | Breed ..................... B60C 11/24 701/36 |
| 2012/0315835 | A1* | 12/2012 | Maranville ........ B60H 1/00842 454/75 |
| 2013/0030645 | A1* | 1/2013 | Divine ................... B60K 35/00 701/36 |
| 2013/0038437 | A1* | 2/2013 | Talati ..................... B60K 35/00 340/438 |

\* cited by examiner

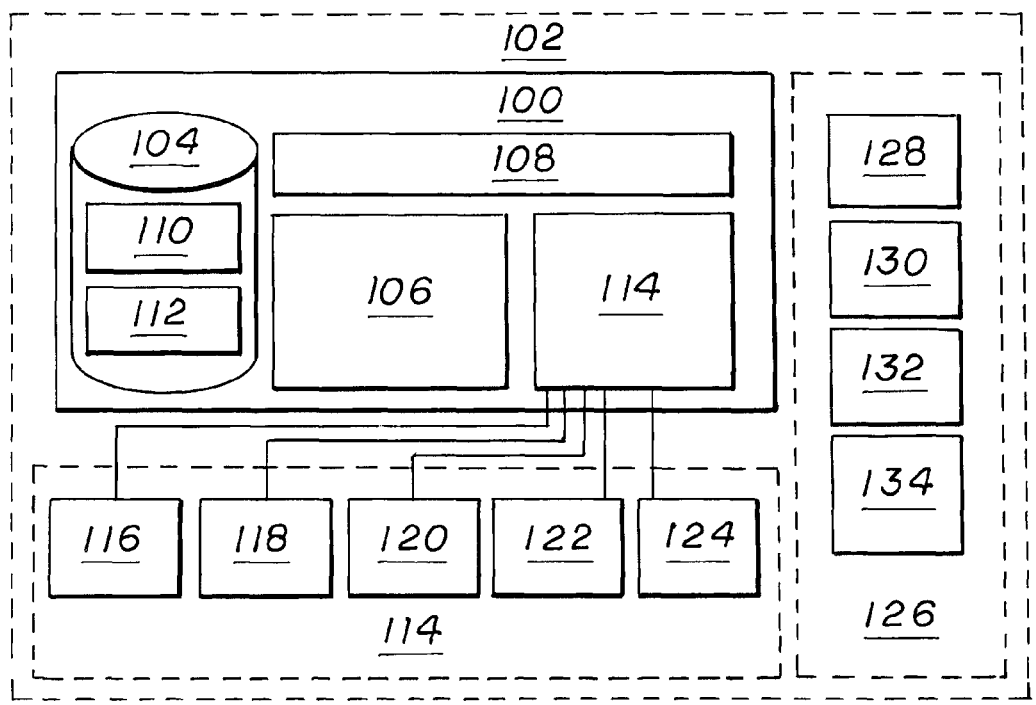
Fig_1
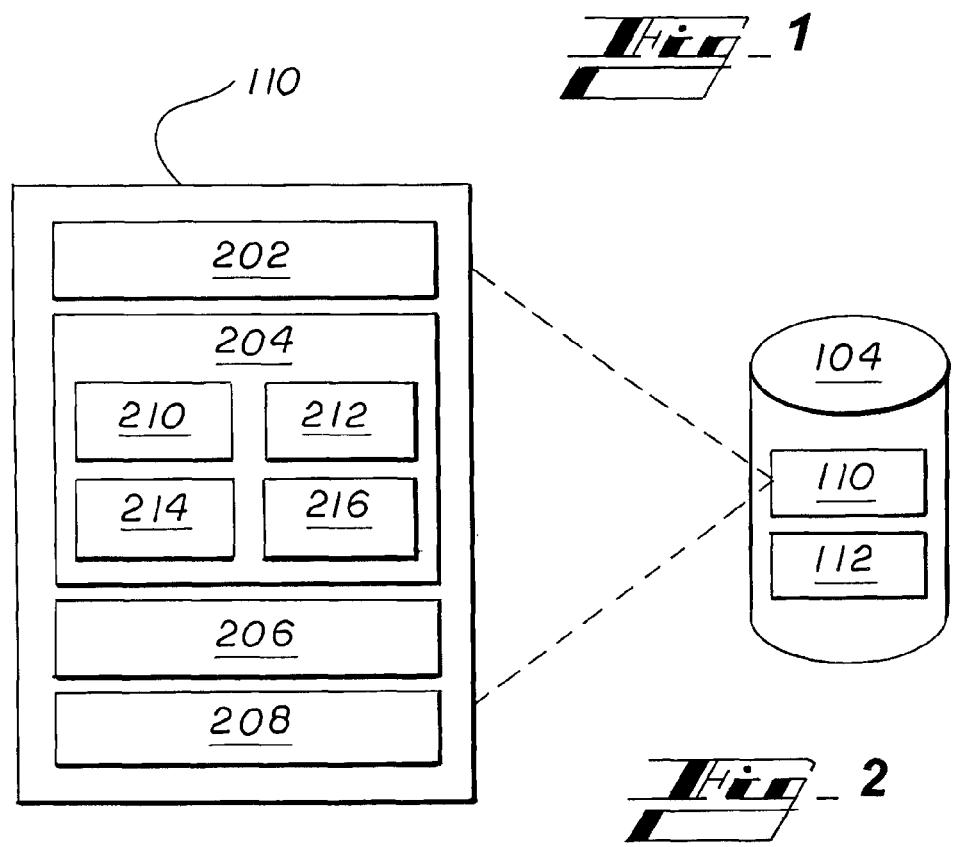
Fig_2

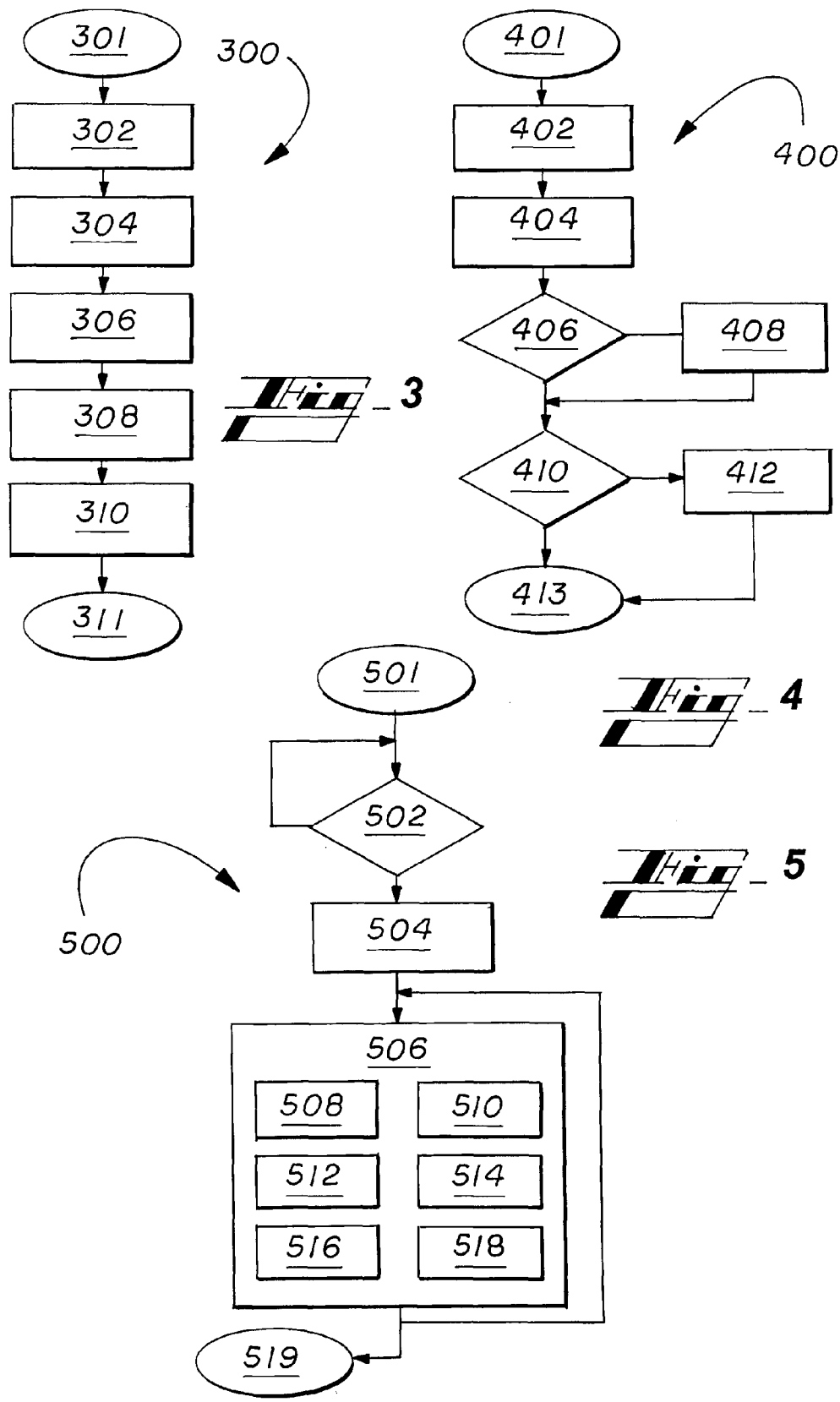

TEAM-ORIENTED HVAC SYSTEM

TECHNICAL FIELD

The present disclosure relates generally to team-oriented human-vehicle interfaces and system and, more particularly, to team-oriented human-vehicle interfaces of heating, ventilation, and air-conditioning (HVAC) systems.

BACKGROUND

Automobiles are becoming increasingly automated. Functions such as cruise control, HVAC performing automatic temperature control, and anti-lock brakes are all but standard on most modern vehicles.

Automated applications of these conventional vehicles are not programmed to be aware of the user in the control loops of the system, and so not to react to or consider the user in a collaborative manner. The applications, rather, operate according to a uni-directional, supervisory model, wherein the human user is considered supervisor of the application. The users enter their input to these applications and then they run as standalone programs.

Research reveals numerous historical events and everyday circumstances that would have been or would be benefitted from a more-collaborative framework between users and their vehicles. Some of these instances are safety-related, and some relate more to convenience, utility, and others.

In one event, an autopilot system of an aircraft was programmed to release control to the pilots automatically and immediately upon a determination that the aircraft steering had changed by a certain amount. In the unexpected instance, the autopilot system began auto-steering the craft to counter effects of ice developing on a wing of the aircraft. Because the system was not designed with consideration to receiving input from the pilots, or more importantly in this case, to advising the pilots why actions were being taken and what actions were planned, likely, and/or imminent, the flight crew was not aware that the ice was forming, or that the autopilot was adjusting increasingly craft steering in compensation.

When the pre-set amount was reached, the autopilot system, accordingly to its programming, immediately and without warning relinquished control. The flight crew, knowing that they were flying in rough conditions, and following protocol, unexpectedly needed to deal with a sudden emergency condition. An improved interface, promoting improved user-vehicle communications, would avoid such problems.

On an every-day basis, people use newly-developed in-vehicle automations. Research has shown that users are adopting many automations slowly because the users, understandable, do not know how they work and/or are not comfortable giving up control to the automation.

Conventional vehicle automation does not go far, if anywhere, to explain its behavior, and is generally inconsiderate of the human state. Therefore, it does not do much to promote trust, or do well at predicting user behavior or reacting appropriately.

In uni-directional interaction, the human also treats the vehicle as a subordinate, disregarding its physical limitations and computational needs and constraints.

There is a need for vehicle systems that are aware of the user, user desires or preferences, and user needs. The sought systems would also combine this data with situational awareness to determine best courses of action and timing, and assist the user in understanding system operations, trusting the system, and feeling comfortable with the ongoing user-system relationship.

The solution involves creating and implementing a team-oriented, collaborative framework. The solution was created in part with some consideration given to findings in a variety of fields of thought, including social science (philosophy, sociology, social psychology), computer science, artificial intelligence, and human factors.

SUMMARY

As referenced, conventional systems are not programmed to react or to consider their users in a collaborative manner, but rather according to a supervisory model whereby human users are considered application supervisors. The user provides input to the applications, which then run in a stand-alone manner.

Collaborative applications, operating according to computational algorithms, perform actions including making decisions, making recommendations to the user, assisting the user, acting as a resource for the user, allocating tasks, and scheduling vehicle activities, with consideration given to the user as a team member, or peer. The team, or peer group, in one contemplated embodiment, includes, in addition to the vehicle agent and user team member (e.g., human driver), one or more other persons or devices, such as a parent or human supervisor of the driver, a passenger of the vehicle, or a remote system, such as remote customer-service center personnel and/or server, as described in more detail below.

Other aspects of the present invention will be in part apparent and in part pointed out hereinafter.

DESCRIPTION OF THE DRAWINGS

FIG. 1 schematically illustrates an on-board computer architecture, according to an embodiment of the present disclosure.

FIG. 2 illustrates in more detail example memory components of the computer architecture of FIG. 1.

FIG. 3 shows an exemplary method 300 for forming a collaborative team, including a user team member account or profile, and any ancillary accounts and sub-accounts, according to embodiments of the present technology.

FIG. 4 shows an exemplary method 400 for determining present team members for a current vehicle operation within the collaborative team framework, according to embodiments of the present technology.

FIG. 5 shows an exemplary method 500 for performing general functions of the collaborative team framework, using the team determined in the method 400 illustrated in FIG. 4, according to embodiments of the present technology.

DETAILED DESCRIPTION

Figure 6:
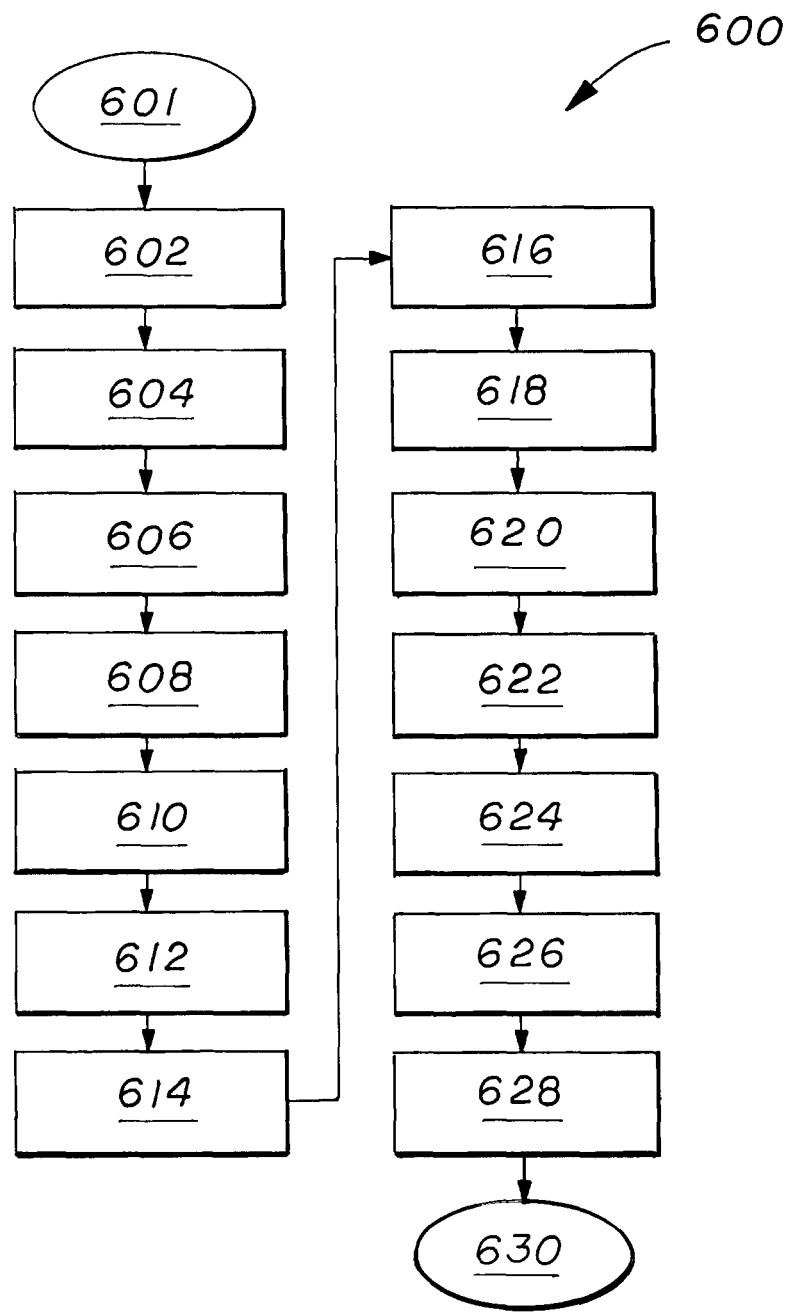
FIG. 6 shows an exemplary method 600 for performing functions of the collaborative team framework in connection with a particular, example, application, being a heating, ventilation, air-conditioning (HVAC) system, according to embodiments of the present technology.

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

The figures are not necessarily to scale and some features may be exaggerated or minimized, such as to show details of particular components.

In some instances, well-known components, systems, materials or methods have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

I. Overview of the Disclosure

In various embodiments, the present disclosure describes a team-oriented, collaborative, solution for use in an automotive context. More particularly, the technology is directed to an improved heating, ventilation, and air-conditioning (HVAC) system.

The team-oriented human-vehicle-interactive (HVI) system (or human-machine interface (HMI) or the like) of the present technology is an automated system that acts as a team, or peer, member, collaborating with other team members toward joint, group, goals. A simple example goal is obtaining desired temperatures in both front and passenger HVAC zones.

As described further below, in addition to the human driver and vehicle agent as team members, the team can include one or more other persons and/or devices, such as a parent of the drive, a child of a driver, a tourist (using, e.g., a rental car), a supervisor of the driver, a passenger of a chauffeured car or other passenger, a remote system, such as a person or server of a remote customer-service center with which the vehicle agent team member communicates, or an application (app), or another in-vehicle or external system of an infrastructure or another vehicle.

An example remote customer-service center is the control center of OnStar®. OnStar is a registered trademark of the OnStar Corporation, which is a subsidiary of the General Motors Company.

And the vehicle agent team member collaborates with the user team member. That is the team members work jointly, according to pre-prescribed protocols, towards a joint, or team, goal.

The system is computerized, including a processor and a computer-readable medium having stored thereon computer-executable instructions that, when executed by the process, cause the processor to perform the operations of the solution. The system can be a sub-system of the vehicle, and the computerized aspects thereof can be, or be a part of, a primary vehicle control unit—e.g., vehicle electronic control unit (ECU). In one embodiment, the medium resides on a remote server. Along with the instructions, or code, the medium can include supporting data, as described further herein.

The solution, which is largely software based, defines a framework for collaborative human-vehicle interactions, between an automated system of the vehicle and the human, user team member. Therein, the user team member and vehicle team member interact repeatedly throughout an ongoing team relationship.

The system, including the computer-executable instructions/code, is configured so that the interactions promote perception, by both the user team member and the vehicle team member, of the other as part of facilitating and nurturing a long-term collaborative relationship. User team members and automated applications are conceived as team members and, as such, are aware of each other and committed mutually to their collaborations and support of each other's needs and preferences.

To achieve the collaborative, team-based type of relationship, the automated features provide a team-based human-machine-interface (HMI) and system framework. The team-based HMI framework includes three modules. The three modules include: 1. a team-oriented interface module; 2. a machine-and-user representation model module, including four models relating to the machine and user; and 3. a team-based computational module.

While the present technology can be applied to a variety of vehicle sub-systems, the present application is directed to application of the technology in support of heating, ventilation, and air-conditioning (HVAC).

Other applications for the technology include implementations with any of the following vehicle sub-systems: navigation, headlights, other lights, adaptive infotainment (broadcast radio, satellite radio, digital radio, videos, etc.), power management, dialogue systems, and parking assist. The concepts can also be used to provide contextual and personalized help functions (or, simply, contextual help), including bi-directional communication supporting help requests and feedback provision (e.g., help features: electronic user manual and other help functions, whether driving), and automated driving features such as automated steering, semi-autonomous driving functions, lane-centering (LC), lane-changing (LX), and transfer of control (TOC).

Other example vehicle systems and sub-systems into which the present collaborative framework can be implemented include security (including cyber-security and lock/start/remote interaction with the car by WIFI/internet/mobile; implementation including team-oriented communications will increase the trust of the user of the team and vehicle agent and the vehicle agent will be sensitive to abnormal requests or events, and communicate with user, etc. (e.g., police, parent, or other authority), power management (including fuel efficiency or other fuel-related considerations, battery state of charge (SOC), environmental considerations, hybrid vehicle, electric vehicle, or fuel-cell characteristics and considerations, fuel cell, gear shifts, modes of drive; e.g., the system can cooperate with the driver to optimize fuel economy and/or battery state of charge based on user profile/preferences/path, etc.), environmental considerations outside of power management, navigation (e.g., based on GPS or other, e.g., social-media based, vehicle-to-vehicle (V2V) interaction, relation to land marks such as cell stations or other infrastructure (V2I)), and management and user interaction with location-based services (LBS; such regarding stores, services, coupons).

Still other example implementations of the present technology include with systems of sub-systems relating to radio and other means of entertainment (including or distinct from infotainment functions), web management (e.g., e-mail, short-message system (SMS) messaging, social networking and social interaction), learning systems (e.g., educational system facilitating user learning about environment, museums, touristic information), vehicle health management system (VHMS, which can provide, e.g., warnings, messages to the driver or other interested parties or devices (e.g., server)), phone, V2V connectivity, general interaction with vehicle (e.g., relating to operation of windows, wipers, lights, headlights, tires, engine), radio or other audio-related settings or preferences, and seat belt operation (driver and/or front or back-seat passengers).

In each implementation (i.e., for any of the uses, or applications, described herein above), the seven (7) teamwork features of the cooperative HMI described herein are applied. The teamwork features can also be referred to by other names, such as collaboration features, commitment features, etc.

The framework of the present technology includes and uses certain types of information, including information representing user-vehicle interactions, important to creating a user-vehicle agent team for operation of a system, such as the HVAC system, of the vehicle over time.

While the present technology is described primarily herein in connection with automobiles, the technology is not limited by the focus. Rather, it will be appreciated that the concepts, of a cooperative, team-oriented human-vehicle interface and system, and supporting modules, models, and encompassing computer-executable instructions or code, can be extended to a wide variety of applications. The applications include aircraft, marine craft, manufacturing, education, home appliances, entertainment, consumer electronics, the like, and other.

II. FIG. 1—On-Board Computing Architecture

Turning now to the figures, and more particularly the first figure, FIG. 1 illustrates a computer 100, such as an on-board computer (OBC) of a subject, or host vehicle 102, according to an embodiment of the present disclosure. The OBC 100 can be, or be a part of, a primary computing unit of the vehicle 102, such as a primary electronic control unit (ECU) of the vehicle 102.

The OBC 100 includes a computer-readable storage medium, or memory 104 and a processor 106 in communication with the memory 104 by way of a data bus 108.

In various embodiments, the memory is any of a volatile medium, a non-volatile medium, a removable medium, and a non-removable medium.

The term computer-readable media and variants thereof, as used in the specification and claims, refer to tangible storage media. The media can be a device, and can be non-transitory.

In some embodiments, the storage media includes volatile and/or non-volatile, removable, and/or non-removable media, such as, for example, random access memory (RAM), read-only memory (ROM), electrically erasable programmable read-only memory (EEPROM), solid state memory or other memory technology, CD ROM, DVD, BLU-RAY, or other optical disk storage, magnetic tape, magnetic disk storage or other magnetic storage devices.

The memory 104 includes one or more storage modules storing computer-readable instructions executable by the processor 106 to perform the functions of the OBC 100 described herein.

For instance, the memory 104 includes team-based vehicle-machine framework modules 110. The memory 104 in some embodiments also includes ancillary or supporting components 112, such as additional software and/or data supporting performance of the methods of the present disclosure.

The vehicle 102 also includes a communication sub-system 114 for communicating with external devices. The communication sub-system 114 can include a wire-based input/output (i/o) 116, at least one long-range wireless transceiver 118, and at least one short-range wireless transceiver 120. Two other ports 122, 124 are shown by way of example to emphasize that the system can be configured to accommodate other types of wired or wireless communications.

The vehicle 102 also includes a sensor sub-system 126 comprising sensors providing information to the OBC 100 regarding items such as vehicle operations, vehicle position, and an environment about the vehicle 102, such as light level or weather. The vehicle 102 can be configured so that the OBC 100 communicates with, or at least receives signals from sensors of the sensor sub-system 122, via wired or short-range wireless communication links 116, 120.

In some embodiments, the sensor sub-system 126 includes at least one camera 128 and at least one range sensor 130, such as radar. Other sensor sub-systems include an inertial-momentum unit (IMU) 132, such as one having one or more accelerometers, and/or other such dynamic vehicle sensors 134, such as a wheel sensor or a sensor associated with a steering system (e.g., steering wheel) of the vehicle 102.

The long-range transceiver 118 is in some embodiments configured to facilitate communications between the OBC 100 and a satellite and/or a cellular telecommunications network.

The short-range transceiver 120 is configured to facilitate short-range communications, such as communications with other vehicles, in vehicle-to-vehicle (V2V) communications, and communications with transportation system infrastructure (V2I).

To communicate V2V, V2I, or with other extra-vehicle devices, such as local communication routers, etc., the short-range communication transceiver 120 may be configured to communicate by way of one or more short-range communication protocols. Example protocols include Dedicated Short-Range Communications (DSRC), WI-FI®, BLUETOOTH®, infrared, infrared data association (IRDA), near field communications (NFC), the like, or improvements thereof (WI-FI is a registered trademark of WI-FI Alliance, of Austin, Tex.; BLUETOOTH is a registered trademark of Bluetooth SIG, Inc., of Bellevue, Wash.).

The extra-vehicle, or external, devices to which the OBC 100 can communicate in execution of the functions of the present technology, can include a remote control center. An example control center is the control center of OnStar®, having facilities for interacting with vehicle agent team members and their user team members via long-range communications, such as satellite or cellular communications. As provided, OnStar is a registered trademark of the OnStar Corporation, which is a subsidiary of the General Motors Company.

III. Memory Components—FIG. 2

FIG. 2 shows in more detail the memory 104 of FIG. 1. The components of the memory 104 are now described further with reference to the figure.

III.A. Memory Components

As provided above regarding FIG. 1, the memory 104 includes one or more team-based vehicle-machine framework modules 110. And the memory may also include ancillary components 112, such as additional software and/or or data supporting performance of the methods of the present disclosure.

The ancillary components 112 can include, for example, user and other team-member accounts and profiles, and also pre-agreed terms of coordination for use, for example, when the user is irresponsive. The components 112 can also include collaboration triggers for triggering entering of a collaboration, team-oriented, mode for the vehicle in connection with one or more established collaboration applications (e.g., team-oriented adaptive cruise control (ACC) system and team-oriented HVAC system). These and other data components are described elsewhere, herein, including below in connection with the methods 300, 400, 500, 600, of operation.

As shown in FIG. 2, the modules 110 can include at least three (3) modules 202, 204, 206, described further in the next section. In one embodiment, the modules 110 include one or more additional modules. Some instructions can be part of more than one module, and functions described herein can be performed by processor execution of the corresponding more than on module.

Functions described herein, but not in connection expressly with one of the three modules 202, 204, 206 can be a part of one of the three modules and/or a part of an additional module 208. The supporting module(s) 208 can include, for example, a user-identification module and/or a passenger-identification module.

The modules include a team-oriented interface module 134, a machine-and-user-representation model module 136, and a team-based computational module 138. Each of these modules is described in more detail next.

III.B. Team-Based Modules

As provided above, to achieve the collaborative, team-based type of relationship, of the present automotive technology the automated functions provide a team-oriented, collaborative, framework. The team-based framework components or modules include 1. a team-oriented interface 202 (FIG. 2), 2. a user-machine representation models module 204, including four models 210, 212, 214, 216, and 3. a team-based computational module 206.

The modules are related to the technology in any one or more of a variety of ways. In one embodiment, one or more of the modules are components of the computer-executable code or instructions, described above in connection with the computer or controller illustrated in FIGS. 1 and 2.

In one embodiment, one or more of the modules are used in configuring the algorithm outlining the functions and operations described herein, including those of the method described below in connection with FIG. 3. Any function or operation described herein, for instance, is in some embodiments configured based on one or more of these modules. This foundational consideration is given by a designer or maker of the system, by the user team member, and/or by the vehicle system itself.

III.B.i. Team-Oriented Interface Module

The first module 202 (FIG. 2) of the three (3) team-based or collaborative modules or components referenced above is the team-oriented interface module. The team-oriented interface (or TOI), includes any of a wide variety of concepts and interaction protocols configured to promote collaborative, efficient, and effective interactions between the user team members (e.g., human driver of the vehicle and the vehicle system). The interactions are configured to allow the vehicle-agent team member (or VATM) and the user team member (UTM; or user agent team member (UATM), or the like) to share information and learn from each other, so they can use the shared information toward improved, collaborative, team-based operation of the vehicle.

Example TOI features include or use audio, visual, and tactile communication hardware, and the supporting protocols. The TOI hardware includes allows the vehicle agent team member to communicate messages and inquiries to the user team member, e.g., vehicle driver, and to receive comments and inquiries from the user team member.

The hardware and supporting protocols include, for instance, a speaker-microphone system, and underlying protocols, a display-input system, and underlying protocols, a light-input system, and underlying protocols, a tactile-feedback system, and underlying protocols, the like, and other as may be desired by a designer or maker of the system.

In a speaker-microphone arrangement, the computer processor described above, executing computer-executable code embodying algorithms of the present technology (e.g., a speaker-microphone interface protocol and the decision-making algorithm), provides data and questions to the vehicle user team member via a speaker of the vehicle.

The content and format of the data and questions are determined based on operation of the other two primary (2) modules and, in some embodiments, the additional technology considerations, including the seven (7) teamwork or collaboration features, which can be referred to in other ways—e.g., data features, algorithmic features, components, data components, attributes, data attributes, attribute data, feature data, etc., and which are described further below.

The data and questions are configured, for instance, to advise the user team member of vehicle agent team member needs, initiatives, and goals, and possibly reasons for the same. As described further herein below, the vehicle system uses feedback received from the user team member via the speaker-microphone system, and/or other communication channels described herein (e.g., touch-sensitive display), in determining which of the user team member and vehicle agent team member will perform select tasks.

While the vehicle agent team member may determine initially that the vehicle agent team member should control performance of an action automatically, for instance, the vehicle may, based at least in part on user team member input via the microphone, determine to allow the user team member to self-control the action. The vehicle agent team member would in some such cases provide an advance communication to the user team member of such decision, possibly advising the user team member of a change in plans based on the user team member feedback.

Or, vice-versa—i.e., the vehicle agent team member may determine initially that the user team member should perform an action, and then, based at least in part on user team member input via the microphone, determine that the vehicle should perform the action automatically. Again, the vehicle agent team member would in some cases provide an advance communication to the user team member of such decision, possibly advising the user team member of a change in plans based on the user team member feedback.

Similarly, in the converse, the user team member may initially determine that the user team member will perform an action, but based on vehicle communication provided to the user team member via the speaker, determine that it is better for, or for other reason allow, the vehicle to perform the action. Again, the vehicle agent team member would in some such cases provide an advance communication to the user team member of system acquiescence to the user team member decision, possibly advising the user team member that the change in plans is based on the user feedback.

Completing these example scenarios, the user team member may initially determine or understand that the vehicle agent team member will perform an action, but based on vehicle communication provided to the user team member via the speaker, determine that it is better for, or for other reason determine, that the user team member should or will execute the action. And once again, the vehicle agent team member would in some such cases provide an advance communication to the user team member of system acquiescence to the user team member decision, possibly advising the user team member that the change in plans is based on the user team member feedback.

Example actions include controlling a driver's zone temperature, a passenger zone temperature, a driver's zone fan level, a driver's zone fan level, controlling a defrost level, a humidity level, and a defog operation.

As provided, another input/output configurations can include a visual sub-system. The visual sub-system can include a display, such as a display screen, holographic display, etc. The sub-system can also be configured to receive user team member input, such as via the display being touch-sensitive—e.g., a touch-sensitive display screen. The vehicle agent and user team members can interact via the visual sub-system in generally the same manners described above in connection with the speaker-microphone system.

As also provided, another input/output configurations can include a light sub-system. The visual sub-system can include one or more lights, such as light-emitting diodes (LEDs). The sub-system can also be configured to receive user team member input, such as via buttons, switches, etc. The vehicle agent team member and user team member can interact via the visual sub-system in generally the same manners described above in connection with the speaker-microphone system.

In one embodiment, the system includes or is in communication with a selector (e.g., dial, switch, pull-down menu, slider, etc. (hardware or displayed via hardware, such as a touch-sensitive display)) by which the user can control a level of control, or authority given to the user and/or the vehicle agent team member. The system can have, for instance, a default setting of 50/50, or a level of 65% user authority, and the user can adjust the setting as desired.

The input/output configurations in one embodiment include one or more tactile features, such as a tactile-communicating steering wheel or driver seat. In one example, the vehicle and agent thereof are configured to provide to the user team member a tactile signal, such as vibration or slight other movement via the steering wheel, to advise the user team member of a certain condition.

As with all communications, a tactile communication can be accompanied by one or more other communications to the user team member, such as a light indicator illuminating and/or synthetic voice or other audible message provided to the user team member in combination with the tactile communication.

As referenced, the vehicle and agent thereof can be configured in any of a variety of ways in order to provide and receive input to/from the human team member. The agent may, for example, provide a visual inquiry to the user team member, to which the human team member can reply by voice. The vehicle or agent designer or maker can implement any such channels of communication, and combinations thereof for inter-team communications.

In operation, the team-oriented interface (TOI) generally acts as a buffer between the vehicle agent team member and the user team member. In doing so, the TOI facilitates the team, group process in practice.

III.B.ii. Models Module

The second module 204 (FIG. 2) of the three (3) above-outlined modules can be referred to generally as a behavior module. The module includes, or is based on, any of four (4) supporting models 210, 212, 214, 216 (FIG. 2).

The behavior module, generally, defines, outlines, and uses behavior models of both the vehicle agent and user team members. The models are used in configuring communications to the user team member, interpreting feedback from the user, and making decisions based on the algorithms of the present technology in combination with the consideration given to any user team member feedback and known underlying user team member expectations and psychology.

As a general example, while the vehicle agent team member may otherwise determine that it is best for the vehicle to take a certain HVAC-related action, based on user team member feedback and the collaborative principles of the algorithm, the agent may change the determination to allow the user team member to perform the task.

The feedback may include, for example, the user team member simply saying that the user would like to perform the maneuver, or the user team member providing more details, such as explaining to the vehicle that the user team member believes that the passenger zone fan level should be increased, rather than lowering passenger zone temperature, to improve passenger zone comfort. As another example, the driver team-member may suggest that the vehicle agent communicate with the passenger as part of determining passenger-zone-related settings.

As described further below, the vehicle system is further configured to store aspects of such interactions with the driver, and consider them in future situations. The next time that a similar situation arises, the vehicle may take an action automatically, such as communicating with the passenger-zone passenger.

As another example, the vehicle agent team member may determine initially that an HVAC action should be proposed to the user team member. The vehicle agent may, subsequently, though, based on user team member feedback and/or agent sensing of present conditions in the vehicle, determine that the user team member has commenced a phone call and that it is best for the vehicle to autonomously determine the action to take and initiate the action.

Again, the vehicle agent team member would in some such cases provide an advance communication to the user team member of the vehicle decision, and possibly reasons therefore.

In a follow-on example, the vehicle system may receive input from the user advising that the user team member wishes to perform an action, such as controlling passenger-zone temperature, and may provide supporting details processed by the vehicle, such as that the user team member phone call is ending immediately or that the user team member is not actually on the phone, but rather verbally speaking to a note-taking, transcribing program, or that a passenger is in a phone call, not the driver.

These are just a few of a myriad of scenarios in which the vehicle and user team member collaborate to determine and executed best actions.

III.B.ii.a. Machine Behavioral Model

The first model 210 (FIG. 2) of the four (4) models, of the second module 204 of the three (3) collaborative modules for the present framework, is the machine behavioral model.

The machine, or behavioral model models the physical machine and its control logic. The model serves as an input to the algorithm, which uses it to make control decisions and initiate automation actions.

III.B.ii.b. Interface Model

The second model 212 (FIG. 2) of the four (4) models, of the second module 204 of the three (3) collaborative modules for the present framework, is the interface model.

The interface model relates to the projection, or presentation, of the machine, as provided to the user team member. The interface model, in other words, outlines how the vehicle agent team member presents itself to the user team member.

The interface model, or vehicle projection, is used as a basis for user team member interaction and the associated user interface(s).

The interface model relates to how the machine explains itself, through the interface, to the user team member, and presents the user with information about the machine in an understandable manner.

The interface model is not the same as the interface module (e.g., section III.B.i., herein). Generally, the model relates to the representation, and the module, including a set of algorithms and related methods (e.g., in the form of computer-executable instructions or code) implements the model (representation).

III.B.ii.c. User Team Member Model

The third model 214 (FIG. 2) of the four (4) models, of the second module 204 of the three (3) collaborative modules for the present framework, is user team member behavioral model, or user model.

The user team member model is built, maintained, and updated by the vehicle agent team member. The model is then considered, e.g., presented to itself (the machine), in order to best process user team member input and make determinations with apt consideration given to the user team member condition—e.g., user needs, initiatives, goals, feelings, etc.

More particularly, the vehicle agent team member builds the user team member model, about behavior of the human user, to include data points such as user team member characteristics. User team member characteristics include, e.g., user gender and physical characteristics, such as user height, weight, etc. The user team member characteristics can also include user life characteristics, such as socio-economic status, marital status, other demographics, the like, and other. Embodiments provide the user team member with control over what user characteristics he/she would like to share with the vehicle agent team member and would like the vehicle agent team member to consider in operation of the relationship.

Still other user team member characteristics that the vehicle agent team member may include in the representation of the user team member includes user preferences, moods, and patterns of behaviors. The vehicle agent team member may determine user team member preferences and moods, like many other characteristics described herein, based on one or more historic interactions with the user team member or other input to the agent indicating user team member preferences, mood, pattern of behavior, etc.

In some embodiments, the vehicle uses one or more of the modules and models described herein in the building, executing (using), or maintaining (e.g., updating or otherwise adjusting) any of the other modules or models. In one embodiment, for instance, the vehicle agent team member uses the user team member model(s) to build the interface module, described above under section III.B.i.

The vehicle agent team member may, in so doing, build the interface module with consideration to ensuring that the interface module is suitable to the user team member preferences, needs, and desires. This type of custom building of the algorithm, or data, protocols, or other factors underlying the algorithm, is provided with the understanding that each vehicle user team member is different, and so is best interacted with in a manner custom to them.

As another example of one module or model affecting others, in one embodiment, the vehicle agent team member, in building, executing (using), or maintaining (e.g., updating or otherwise adjusting) the computational module, described more below under Section III.B.iii., the user team member model of present section, III.B.ii.c.

III.B.ii.d. Mental Model

The fourth model 216 (FIG. 2) of the four (4) models, of the second module 204 of the three (3) collaborative modules for the present framework, is the mental model.

The mental model includes, for use by the vehicle agent team member, a representation of the machine from a perspective of the user team member. The mental model can be viewed to codify an image, or operations (initiatives, goals, functions, etc.) of the system, as the vehicle agent team member understands the same to be viewed by the user team member.

As with any of the other models and modules described herein, the vehicle agent team member in some embodiments builds, executes (e.g., uses), and/or maintains (e.g., updates or otherwise adjusts) the mental model. And as in those cases, formation, use, or maintenance of the user team member model can be in part affected by user input. In reply to the vehicle communicating an aspect of the to-them configured user team member model, the user team member can, for instance, advise the vehicle agent team member of a misunderstanding or correction needed, and the vehicle agent team member would amend the user team member model accordingly.

III.B.iii. Team-Based Computational Module

The third module 206 (FIG. 2) of the three (3) above-outlined modules can be referred to generally as the computational module, or team-based computational module.

In one embodiment, the team-based computational module defines or controls how roles amongst team members are allocated. This can be referred to as a role allocation function. The module can prescribe, for instance, which roles or tasks are to be performed by the vehicle agent team member and which by the user team member.

For embodiments in which the team includes a remote user or device, such as a remote customer service system or computer server (e.g., OnStar®), the module prescribes which roles are allocated to it. The system can be configured, e.g., such that heavy, non-time-sensitive computations, are performed remote to the vehicle, with results returned to the vehicle.

Similarly, in one embodiment, the team-based computational module defines or controls how resource amongst team members are allocated, used, accessed, and the like. This can be referred to as a resource allocation function. The module can prescribe, for instance, which resources are to be maintained by the vehicle agent team member, and which by a remote team member, such as a remote team member or server—e.g., OnStar®.

The system can be configured, e.g., such that large, cumbersome resources are kept in part or in full remote, and accessible by or provided to the vehicle. Such provision can be made according to a push and/or pull arrangement. In an example push arrangement, the vehicle agent team member receives resource data automatically, such as in response to a source of the data (e.g., OnStar®) determining that a predetermined condition or trigger exists—e.g., weather-related, date related, time-related, vehicle location-based. In an example pull scenario, the vehicle agent team member receives the resource data in response to a request from the vehicle agent team member for the same (e.g., a pull scenario).

In these ways, and/or in any one or more of a number of other ways, the decision making of the automated partner—i.e., the vehicle agent team member, is based on collaboration principles. To the contrary, conventional automated systems are merely supervisory, whereby users only activate the supervisory system, and may monitor behavior of the system.

The team-based human-vehicle interface is based rather on mutual commitment, support, and responsiveness of each team member, human and automated. The collaborative focus includes the vehicle agent team member being user-aware—i.e., aware of user team member characteristics, needs, desires, initiatives, preferences, etc.), the automated system will be aware real-time of their needs and intentions. Users and machines need a common grounding language and the automated behavior is based on some human behavioral model to consider the user in the control loop.

The module in some embodiments includes an interaction protocol, or protocol of interaction. The protocol can be generated and/or include default features, which can or cannot be altered. The user team member can have input into the formation or alteration of protocol features, such as selecting from amongst multiple protocol options presented to the user team member.

The protocol can control, e.g., who communicates when. As an example, in one embodiment, the protocol developed or selected, prescribes that the user team member can communicate to the vehicle agent team member at any time, and the vehicle agent team member communicates to the user team member only when the user team member is not actively communicating to the agent.

Other example protocol variables includes whether the team members can communicate offline, whether explicit or implicit learning is enabled (e.g., whether the vehicle agent team member is to develop a history and conclusions based on explicit user team member input to the system and/or implicit input, such as behaviors, user team member conditions (e.g., talking on the phone or drinking coffee while driving), etc.

The vehicle agent team member thus operates as a team member, and views the user team member (e.g., driver) as a team member as well. The team makes decisions, and all or most all decisions are not made by a single member alone without any consideration for the conditions of the other member(s).

III.C. Additional Considerations for System Development and Operation

The above-described computer-executable code or instructions, including the three (3) modules described above in section III.B., are in various embodiments configured to consider in the algorithms and method of the present technology, any of a wide variety of supporting concepts.

The concepts include, generally, the user team member and the automated suite according to the present technology working together as a team.

The concepts considered in the configuration of the code or instructions include seven (7) attributes or features associated with developing a team comprised of both a human and machine agent—i.e., the vehicle. The teamwork or collaboration attributes or features include 1. commitment, 2. models and transparency, 3. common language, 4. coordination, 5. responsiveness, 6. intimacy, and 7. satisfaction.

Generally, the first, commitment attribute, or feature, relates to a mutual obligation, on behalf of the user and vehicle team members, to engage and maintain joint activity toward a joint goal. The second, models-and-transparency, feature relates to functions configured to promote understandings, on behalf of the vehicle and the user team members, of beliefs, intentions, history, states, and actions of the vehicle agent and the user team members.

The third, common-language, feature is configured to best promote, maintain, and support effective and grounded communications between the user and vehicle team members. The fourth, coordination, feature, contributes to joint-planning efforts, between the user and vehicle team members, and synchronization of such efforts.

The fifth, responsiveness, feature promotes respect, support, and positive reactions on behalf of each of the vehicle and the user team members with regard to the other. The sixth, intimacy, feature, further promotes ease and elegance of communications between the team members (user and vehicle) and more particularly toward goals of increasing levels of trust and sensitivity of each member regarding the other. And the seventh, satisfaction, feature promotes effective uses of the collaborative system by promoting contentment, reward, celebration, joy, recognition, and fulfillment in system usage.

The seven (7) teamwork or collaboration features, or attributes, are described in further detail below under the fourth section (IV) of the present disclosure.

Considerations used in designing and operating the computer-executable instructions, including the three (3) primary modules described above, also include components related to commitments expected on behalf of the user and the vehicle team members.

IV. Seven (7) Teamwork Features

The disclosure now presents in more detail the seven (7) teamwork or collaboration attributes or features referenced above under section III, associated with developing a team comprised of at least the human user team member and the vehicle agent team member. The features cover characteristics determined important to the framework toward meeting the goals of the present technology.

Because the seven (7) features are also algorithm and/or data based in implementation, they can be described as algorithmic features, data features, algorithm and data features, algorithm/data features, algorithm and/or data features, the like, or other without departing from the scope of the present disclosure.

While traditionally, authority has been singular, with the human (supervisor), the present technology is configured away from unilateral, supervisory, or slave-master formats. The technology, rather, provides a framework by which the human user and the vehicle agent are team members, or peers. According to the framework, decisions as to which team member (user or vehicle) will have authority over and control any particular action, task, or activity incorporate a team approach and can, e.g., emanate from a shared-decision-making process.

IV.A. Mutual Obligation Feature

The first of the seven (7) features, associated with developing a team comprised of at least the human user team member and the vehicle agent team member, is mutual obligation. This feature prescribes mutual obligations and commitments amongst respective team members to engage together and work together toward a joint activity. As provided an example activity is determining a vehicle temperature, generally, or, more particularly, determining a passenger-zone temperature setting.

In one embodiment, the vehicle agent team member is configured to request and receive, or at least receive, a confirmation or obligation communication from the user team member indicating that the user team member will participate in the team relationship. The confirmation can in some embodiments be an inherent acquiescence, such as by the user team member interacting ongoingly with the vehicle agent team member. In one embodiment, the confirmation is explicit, such as the use team member providing a verbal or touch-screen 'yes' response to a request for confirmation from the vehicle agent team member.

In one embodiment, the vehicle agent team member, in response to determining that a user team member confirmation of participation exists, creates a team-member profile for the user team member. The vehicle agent team member populates the profile with data procured in any of a variety of ways, including from the user team member explicitly, in response to sensed user actions or behavior, according to system defaults pre-programmed into the vehicle agent team member, etc. The vehicle agent team member maintains the profile over time, such as updating or otherwise adjusting the profile.

The profile includes, for instance, any of personal preferences of the user team member, and demographic information about the user team member, such as age, gender, weight, height. Example preferences include music genre preferences, system operation preferences, such as how the user team member would like the vehicle team member to act or react in certain situations.

In one embodiment, the vehicle agent team member, in response to determining that a user team member confirmation of participation exists, binds itself to acting jointly with the user team member, i.e., to the joint activity. In some embodiments, the vehicle agent team member communicates to the user advising that the vehicle agent team member considers itself so bound to the team and its joint activity.

In one embodiment, the vehicle agent team member, in response to determining that a user team member confirmation of participation exists, considers the user team member bound to acting jointly with the vehicle agent team member. In some embodiments, the vehicle agent team member communicates to the user team member advising that the vehicle agent team member considers the user team member so bound to the team and its joint activity.

Once the vehicle agent team member determines that it is engaged, i.e., engaged in the joint activity, the vehicle agent team member therein commits to not exiting the venture, such as by quitting without warning.

In one embodiment, a level of such commitment is communicated to the user team member by the vehicle agent team member. Results of such communication include fostering or increasing allegiance on behalf of the user to the joint activities, fostering or increasing trust in the user team member of the team, the team concept, and of the operations of the vehicle agent team member toward the team goals.

As an example of the vehicle agent team member commitment in operation, in response to the vehicle agent team member determining that a limit of operation (e.g., a predetermined temperature, fan setting, humidity level, or other operational limit) is reached, the vehicle agent team member will annunciate such determination, or a result of the determination (e.g., manual control to be re-instituted imminently), to the user team member in a timely manner.

The vehicle agent team member is in some cases configured to, if the resulting action indeed includes the vehicle agent team member (VATM) relinquishing some control, degrade from automatic VATM control as gracefully as possible, and with any initial feedback and any additional feedback or parallel communications to the user agent team member deemed appropriate by the vehicle agent team member, such as to advise the UATM of the degradation.

The team can also be configured to address potential safety concerns, which may involve action unrelated specifically to the HVAC system. As an example, and as another example of potential transfer of control between the user and vehicle agent team members, consider a situation in which the vehicle agent team member determines that the user team member is in a detrimental state, such as being under the influence of alcohol or drugs, falling asleep, or having a sudden medical attach.

The vehicle agent team member is in some embodiments configured to take any of a variety of actions in such cases. The actions can include temporarily exiting the team relationship, and taking supervisory control at that point, such as to pull the vehicle over to a safe parking location, to a hospital, etc.

In one embodiment, the vehicle agent team member is configured to perform the actions including communicating with one or more external entities or parties. The external parties can include, e.g., a parent of the user team member, authorities, such as the police, hospital, fire department, the like, or other.

In one embodiment, the vehicle agent team member is configured to perform the actions including staying in the team relationship, but taking at least one supervisory-type action, with less or no consideration being given to the user team member (e.g., for the safety of the user).

IV.B. Models and Transparency Feature

The second of the seven (7) features, associated with developing a team comprised of at least the human user team member and the vehicle agent team member, relates to models and transparency.

The models and transparency feature includes two primary aspects: (1) consideration to a need or desire on behalf of each team member to understand and appreciate the belief system of the other of the team members, and (2) transparency and visibility of the states (or conditions), intentions (or goals), and computations (or functions or thought processes) of each team member to the other team member.

Regarding the first, (1) consideration to a need or desire on behalf of each team member to understand and appreciate the belief system of the other of the team member, in one embodiment it is assumed by the vehicle agent team member, based on the user team member having committed to the joint activity, i.e., to the team framework, that the user team member will continuously during vehicle operation, or at least substantially or generally, be seeking when able to understand the context from which the vehicle agent team member operates. The context can include, e.g., the reasons that the vehicle agent team member does what it does, goals or initiatives of the vehicle agent team member, needs for operation of the vehicle team member.

Moreover as part of the first item, regarding the consideration toward a need to understand the belief system of the other member, the vehicle agent team member builds and maintains (e.g., updates or otherwise adjusts) a model of a context of operation of the user team member. This model might be extended to include ontologies—e.g., more general information about the world. Example user team member context can include user preferences, user demographics (age, gender, etc.), and historic user behavior (e.g., patterns of user actions taken in the vehicle during or outside of the joint operations). The ontology can include, e.g., weather conditions, traffic conditions, mass or crowd activity or trends, geographic location, local events (e.g., concert or sporting event), local characteristics (e.g., topography), and general human characteristics, such as an aversion to noises above a certain decibel level, light above a certain level of brightness, etc.

Regarding the second item, regarding transparency and visibility of states, intentions, computations, activities, etc., an underlying goal includes promoting trust and candor within the team and its activities, thereby inhibiting hidden agendas on behalf of any of the team members. In one embodiment, the vehicle agent team member receives input from the user team member about a belief system of the user team member.

The input can be express, or direct, or it can be indirect, or inferred. As an example of indirect communication, the input can be inferred by the user giving to the vehicle agent team member permission to be perceived by one or more sensors, such as a camera, of the vehicle. As another example of assumed approval, the vehicle agent team member can infer a belief of the user team member in response to the user team member reacting to the system, such as continuing to answer helpfully inquiries provided to the user team member by the vehicle agent team member.

Further regarding the second item, regarding transparency and visibility of states, intentions, computations, activities, etc., with the underlying goal of promoting trust and candor, in one embodiment, the vehicle agent team member provides, to the user team member, information about the configuration or operation of the vehicle team member. The information can include, e.g., information about states of the vehicle agent team member, intentions of the vehicle agent team member, or explanations about how the vehicle makes decisions, such as by an explanation about how the vehicle agent team member will react in certain circumstances, or why the vehicle agent team member has acted in a certain manner recently or in the past.

It will be appreciated that sharing and processing usefully information about team members is not a trivial task. The task involves information abstraction, information integration, such as by integration tools or sub-processes of computer-executable code, into existing data and algorithm components, and subsequent interpretation, or understanding, of the new data in combination with existing algorithms and data.

IV.C. Common Ground Feature

The third of the seven (7) features, associated with developing a team comprised of at least the human user team member and the vehicle agent team member, relates to building, or building and maintaining (e.g., updating or otherwise adjusting) a common or basic ground for communications, and shared communication language.

In operation, the vehicle agent team member receives from the user team member, with information indicating how the user communicates. As an example, the user may advise the vehicle expressly of a preferred language (e.g., English, French, Spanish), or indirectly, such as by speaking the language in communicating with the vehicle agent team member.

As for its output in this way, the vehicle agent team member (VATM) communicates to the user team member (UTM) information regarding preferences of the VATM. The preferences include, e.g., data about a VATM optimization scheme, including pre-programmed preferences. The VATM thereafter communicates with the user team member in a way that the VATM has determined that the UTM will comprehend and feel comfortable with.

IV.D. Coordination Feature

The fourth of the seven (7) features, associated with developing a team comprised of at least the human user team member and the vehicle agent team member, relates to coordinating plans and activities of the team members. The feature also includes establishing new automated behaviors.

In one embodiment, the vehicle agent team member (VATM) is configured to establish a new automated behavior in any of a variety of circumstances. An example circumstance includes the VATM proposing an action (such as that the vehicle automatically adjusts a humidity setting of the vehicle in response to determining that a certain external humidity and/or temperature has been reached), and the user team member (UTM) agreeing to the proposal. This feature includes the computational process of arriving at the action, in addition to executing the action itself. In one embodiment, the VATM is configured to establish the new automated behavior in such situation if the UTM does not express disagreement with the proposed course of action.

In one embodiment, the VATM is configured to provide to the UTM pre-generated advice for consideration by the UTM. The advice may be generated by the VATM and may be stored at the VATM. In one implementation, the advice is received from a remote source, such as a remote customer-service center, e.g., OnStar®. In operation, the UTM may find such advice persuasive, and alter his/her behavior, or be influenced to agree to or deny a related VATM-suggested action. Such automated advice may be especially informative or persuasive to the user, e.g., when time and/or information is limited, or when a complexity of a decision that the UTM is faced with is relatively high.

The VATM is also configured to take into account a model and predicted behavior of the UTM. And the VATM is further configured with data indicating that the UTM will plan and act with consideration given, or appreciation of, plans and goals of the VATM.

This mutual awareness, or coordination, of the team members leads to a condition whereby partial plans and activities can be meshed by one or both team members to form sufficiently complete action decision. And the resulting decision will be holistic, respectful of the context of the team members IV.E. Mutual-Responsiveness Feature The fifth of the seven data (7) features, associated with developing a team comprised of at least the human user team member and the vehicle agent team member, relates to a mutual responsiveness between the user team member (UTM), the vehicle agent team member (VATM), and any other members.

The responsiveness includes, on behalf of each team member, respect for, support of, and responsiveness to the needs and goals of the other team member. For instance, the VATM conducts its action while being supportive to the activities and goals of the UTM. Similarly, the VATM is in some embodiments configured in part based on an assumption that the UTM will be conducting his/her actions while being supportive of the activities of the VATM and responsive to the needs (e.g., information from the UTM) of the VATM.

Based on this data and these configurations, VATM can recognize when the user may be having trouble acting or responding. The VATM may notice such inconsistency, or abnormalcy, in, e.g., a delay on the part of the UTM in responding to a trigger or condition, or a failure of the UTM to take an expected or needed action. The VATM is configured to, in response to the recognizing the apparent trouble, take appropriate action, such as communicate with the UTM regarding the same, perform a supervisory function (e.g., taking control and parking the vehicle without user input), or contact a parent or supervisor of the user, contact a hospital, authorities, etc.

IV.F. Sensitivity Feature

The sixth of the seven (7) features, associated with developing a team comprised of at least the human user team member and the vehicle agent team member, relates to promoting a sensitivity among members of the team to the other member(s) of the team.

The sensitivity can be referred to as a social sensitivity, and the vehicle agent team member configured to consider sensitivity toward promoting a sense of intimacy within the team.

The VATM is in one embodiment configured to be sensitive to subtleties of the condition or state of mind of the UTM, whether that state is communicated to the VATM directly, and the VATM is familiar with operations of the UTM.

The VATM may use information about a mental state of the UTM and/or about an interaction style of the UTM toward engendering a comfortable atmosphere for the UTM.

The VATM is in one embodiment configured with an understanding that the UTM will be sensitive to subtleties of the state of the VATM, whether that state is communicated to the UTM directly, and that the UTM is familiar with operations of the VATM.

The framework is arranged in some embodiments with an understanding that each team member will attempt to understand and accommodate the needs and actions of the other in a favorable and elegant manner. The goal is an overall, team behavior that is non-fragmented, harmonious, symbiotic, and holistic.

IV.G. Satisfaction Feature

The seventh of the seven (7) features, associated with developing a team comprised of at least the human user team member and the vehicle agent team member, relates to promoting a sense of accomplishment.

The VATM is in one embodiment configured to provide feedback to the UTM about his/her performance so as to encourage better, more social-like, interaction.

The VATM is in one embodiment configured to provide the feedback so as to encourage a healthy and long-terms relationship amongst the team members.

The human acknowledges when the machine performs satisfactorily, or not (and the machine can take this feedback to update its model and adjust its behavior accordingly).

V. Methods of Operation—FIGS. 3-6

FIG. 3 shows an exemplary method 300 for forming a collaborative team, including a user team member account or profile, and any ancillary accounts and sub-accounts, according to embodiments of the present technology.

FIG. 4 shows an exemplary method 400 for determining present team members for a current vehicle operation within the collaborative team framework, according to embodiments of the present technology.

FIG. 5 shows an exemplary method 500 for performing general functions of the collaborative team framework, using the team determined in the method 400 illustrated in FIG. 4, according to embodiments of the present technology.

FIG. 6 shows an exemplary method 600 for performing functions of the collaborative team framework in connection with a particular, example, application, being a heating, ventilation, and air-conditioning (HVAC) system, according to embodiments of the present technology.

It should be understood that the steps, operations, or functions of the methods 300, 400, 500, 600 are not necessarily presented in any particular order and that performance of some or all the steps in an alternative order is possible and is contemplated. The methods can also be combined or overlap, such as one or more steps of one of the methods being performed in the other method.

The steps have been presented in the demonstrated order for ease of description and illustration. Steps can be added, omitted and/or performed simultaneously without departing from the scope of the appended claims. It should also be understood that the illustrated methods 300, 400, 500, 600 can be ended at any time.

In certain embodiments, some or all steps of the processes 300, 400, 500, 600 and/or substantially equivalent steps are performed by a processor, e.g., computer processor, executing computer-executable instructions stored or included on a computer-readable medium, such as the memory 104 of the system 100 described above.

Some or all of the operations are in some embodiments performed by a processor of a remote machine, such as of another vehicle, or a remote control center system or server, as referenced above. For instance, in one embodiment the user team member account can be created or modified by the user, or supervisor of the user (e.g., parent or boss), such as via a separate computer (e.g., home computer) communicating selectively with the vehicle agent team member and/or a control center server and/or personnel, by such center or server, etc.

Aspects of the methods described herein, including rules or protocols that could underlie the various operations presented, are in various embodiments configured with consideration given to (e.g., based on, or relate to) the precepts outlined herein, including, for example, any combination of the data items described herein—e.g., any of the seven (7) teamwork or collaboration features, any of the data outline in connection with the four (4) team-oriented modules, including the four (4) models therein, and/or any of the general concepts described further below.

V.A. Establishing UTM and Related Accounts and Profiles—FIG. 3

The method 300 begins 301 and flow proceeds to block 302, whereat a processor, such as a processor of the vehicle agent team member (VATM) and/or a processor of a remote device (e.g., e.g., server of a remote customer-service center), establishes a user team member (UTM) account.

The establishing can include creating or forming the account, or building the account, selecting the account, such as by identifying a user of the vehicle to a remote machine already having an account in connection with the user.

The UTM account can be stored in the local memory 104, in full or in part, and/or partially or fully at a remote device, such as a server of a remote control center (e.g., OnStar®). In the local memory 104, the account or parts thereof are in some embodiments stored in the supporting data component, indicated by reference numeral 112 in FIGS. 1 and 2, and accessed selectively by the processor of the vehicle agent team member (VATM).

In one embodiment, establishing the account includes receiving user information from the user. The user information can include a name, name of any other potential drivers of the vehicle, and other personal information. The user information can also include preference information, such as about preferences for how the vehicle should operate—e.g., preferred highway speeds, in-vehicle temperature(s), radio stations, etc.

The UTM account can include any of the data described herein, including UTM feedback to the VATM. The VATM uses the data in operation of the system, in performance of operations in a collaborative manner, according to the present technology, as described above and further below herein.

Establishing the UTM account in some cases includes establishing a UTM profile. The profile can include any of the aforesaid information. In one embodiment, the profile is one part of the account, and the account includes other, non-profile, parts.

In some embodiments, the profile includes, for example, identifying information (e.g., name, account number, e.g., identification for OnStar®) and preferences received from the user, such as preferred highway cruise speed, radio and temperature settings, etc., and the non-profile parts include other data associated with the user, such as data provided by the UTM to the VATM during operation of the team framework in preparing to operate the vehicle and in operating the vehicle.

The UTM account and/or profile can also include identification data other than user name. The data can include data for use in identifying the user when the user enters the vehicle, such as data indicating fingerprint, weight in seat, eye features (e.g., iris or retina), voice, breath, etc.

In one embodiment, the memory of, or used by, the vehicle agent team member (VATM) includes a identification module. Operation of the driver identification module is described further below.

In establishing the UTM account, or thereafter, the processor establishes the UTM as a member of a collaborative, team-oriented/based/focused team including the vehicle agent team member (VATM). The team formation is indicated in FIG. 3 by reference numeral 304. The team formation 304 can precede or include the subsequent team-related functions.

Forming the team can include other functions, including any of the related functions described herein. The functions can include, e.g., requesting and receiving confirmation from the user of their commitment to participate in the team framework, with at least the VATM, going forward for operating the vehicle, or at least an aspect of such operation, such as regarding HVAC, adaptive cruise control, navigation, radio, etc. The functions can also include providing, to the user, a like confirmation that the VATM will be dedicated or committed to the same.

As with all aspects of the methods described herein, the rules or protocols for this part, regarding obtaining and providing commitments, are in various embodiments configured with consideration given to (e.g., based on, or relate to) the precepts outlined herein, including, for example, any combination of the data items described herein—e.g., any of the seven (7) teamwork or collaboration features, any of the data outline in connection with the four (4) team-oriented modules, including the four (4) models therein, and/or any of the general concepts described further below.

Establishing commitments from team members, up front or initially and again after initiation, has benefits including the many described throughout the present disclosure. Example benefits include promoting trust in the team concept and members of the team, commitment to participate as needed, etc.

In one contemplated embodiment, the algorithm includes an operation 306 of establishing, as part of the UTM account or profile, a sub-account, or sub-profiles identifying likely passengers of the vehicle. In a particular embodiment, one or more of the sub-accounts can be indicated and processed as members of the team, and in another data associated with one or more such sub-accounts is considered in performance of the team framework without the sub-accounts being considered as members of the team.

The sub-account/sub-profile can be built and maintained in many of the ways that the UTM account/profile for a driver can be. The corresponding data can include, e.g., name, other personal and demographic data, preferred radio stations, preferred radio volume, preferred temperature, whether the passenger is likely to be a front-seat passenger and/or rear-seat passenger, etc.

In a particular embodiment, the VATM considers at least one passenger as part of the team including the VATM and the driver UTM, and so considers input from the passenger. In another embodiment, the VATM does not consider the passenger as a part of the collaborative team, but does consider input from, or previously established data relating to, the passenger in making one or more VATM decisions.

For cases in which the passenger is to be considered a part of the team, the processor takes appropriate team-formation steps, such as any of the related functions described herein. Example steps include, as provided, e.g., requesting and receiving confirmation from the passenger of their commitment to participate in the team framework for the vehicle, with at least the VATM and UTM, going forward in connection with ongoing operations of the vehicle, or at least an aspect of such operation, such as the adaptive cruise control, HVAC, navigation, etc. The functions can also include providing, to the passenger to have a passenger team member account associated with them in the system, a like confirmation that the VATM will be dedicated or committed to the same.

Again, establishing commitments from team members, up front or initially and again after initiation, has benefits including the many described throughout the present disclosure. Example benefits include promoting trust in the team concept and members of the team, commitment to participate as needed, etc.

The memory of, or used by, the VATM in one embodiment uses the same identification module referenced above to identify a passenger, and in another the memory of, or used by the VATM includes a separate passenger identification module for use in identifying one or more passengers.

In one embodiment, a second driver UTM account or profile is maintained for a person other than that associated with the first UTM. In some instances, a likely passenger is also sometimes a second driver of the vehicle (e.g., a spouse). For such cases, the VATM can be configured to link the passenger account/profile associated, who is also sometimes a driver, with a second UTM or profile for that person. Thus, data of the passenger account for that person can be imported or pulled from the passenger account in establishing, maintaining, or using the second UTM, and vice versa—i.e., data for the second UTM can be used in establishing, maintaining, or using the corresponding passenger account.

At operation 308 of the algorithm 300, the processor (e.g., VATM processor) establishes as a member of the team one or more other parties. As described elsewhere herein, the other team members can include, beyond passengers, a parent of the UTM driver, a supervisor of the UTM driver, a remote device, or such as a remote customer service system or server (e.g., OnStar®). The other team members can also include authorities, such as police, transportation authorities, environmental authorities (e.g., EPA), traffic-related entities, weather-related service providers, etc. In some embodiments, the VATM is configured to consider input from any of such parties or entities, without considering the party or entity as a part of the collaborative team.

For cases in which the additional party (e.g., parent) or entity (e.g., traffic authority) is to be considered a part of the team, the processor takes appropriate team-formation steps, such as any of the related functions described herein. Example steps include, as provided, e.g., requesting and receiving confirmation from the party or entity of their commitment to participate in the team framework for the vehicle, with at least the VATM and UTM, going forward in connection with ongoing operations of the vehicle, or at least an aspect of such operation, such as the adaptive cruise control, HVAC, navigation, etc.

The functions can also include providing, to the party or entity to have a party/entity team member account associated therewith, a like confirmation that the VATM will be dedicated or committed to the same. As referenced, establishing commitments from team members, up front or initially and again after initiation, has benefits including the many described throughout the present disclosure. Example benefits include promoting trust in the team concept and members of the team, commitment to participate as needed, etc.

In addition to obtaining commitments to the team, and joint activity, from each team member, at operation 310, the processor, in connection with each team member, further establishes rapport and common ground with each member.

Establishing further rapport and common ground includes, in some embodiments, establishing preferred communication styles of the VATM, the UTM, and any other team members or team contributors (e.g., weather or traffic server). Establishing communication preferences or standards can involve variables such as language, values, voice-type, volume, number of repetitions or reminders, timing of notifications, rate of communication (e.g., text or audio), the like, and other.

Preferences can include a UTM preference for channel or modality by which to receive notifications, such as via a display screen, speaker, tactile seat or steering wheel, etc. The preferences can identify one or more channels for some situations, e.g., types of communications, and one or more other channels for other situations.

In establishing the rapport and common ground, VATM default settings may have priority over a requested or suggested UTM preference. The UTM may propose, for instance, that the VATM provide an alertness test communication, to see if the driver is alert while driving, only via a visual display; but a VATM default setting requiring, e.g., that such alerts be provided by audible communication, or audible and tactile communication, may take precedent for safety reasons, to accommodate the possible scenarios in which the alertness test may be needed.

The rules or protocols for this part, regarding establishing rapport and common ground, are in various embodiments configured with consideration given to (e.g., based on, or relate to) the precepts outlined herein, including, for example, any combination of the data items described herein—e.g., any of the seven (7) teamwork or collaboration features, any of the data outline in connection with the four (4) team-oriented modules, including the four (4) models therein, and/or any of the general concepts described further below.

The rules or protocols, here regarding building rapport and common ground, can be based or relate, for instance, at least in part on the data items relating to efficiency and effectiveness of communications, building confidence in the team and the VATM, mutual respect, intimacy, satisfaction, and healthy, effective, and efficient feedback loops.

The method 300 can be repeated or end 311.

V.B. Determination of Collaborative Team—FIG. 4

As provided, FIG. 4 shows a method 400 for performing general functions of the collaborative team framework, according to embodiments of the present technology.

The method 400 begins 401 and flow proceeds to operation 402, whereat a processor, executing a driver identification module, identifies a driver who has entered the vehicle. The identification can use any of a variety of vehicle sensors, which may be considered a part of or in communication with the VATM, such as a camera, a proximity sensor, a weight sensor, iris/retina scanner, breath sensor, etc.

As described above, driver identification can be performed using data provided by the person, such as their name, and perhaps also a password, pass code, or other authenticating data. The identification can also or instead be based on driver physical characteristics such as voice, weight, iris or retina characteristics, etc.

Flow of the algorithm proceeds to operation 404 whereat the processor accesses the user team member (UTM) account and profile associated with the driver identified. As provided above, the account and profile can reside in the supporting data indicated by reference numeral 112 in FIGS. 1 and 2.

Flow of the algorithm proceeds to decision diamond 406 whereat the processor determines whether there are any passengers in the vehicle. The determination can be based on input from the UTM and/or from feedback from one or more sensors. As provided, the sensors can include a weight sensor, a voice sensor, a camera, an iris/retina scanner, etc.

In response to a positive determination at decision 406, i.e., a passenger is determined to be in the vehicle, flow proceeds to operation 408 whereat the processor determines whether a passenger account exists. If not, the method may include inquiring of the UTM driver whether they would like to establish a passenger account.

In establishing the passenger account, the processor can determine whether the passenger account is to be linked to an existing other UTM account associated with the passenger, and linking the two accounts if so, which can include the functions of operation 306, referenced above in connection with FIG. 3.

The operation 408 can further include determining whether such passenger user account, whether pre-established or presently established, is or should be stored in the system as a team-member account. If not, data associated with the passenger (e.g., radio volume preferences, temperature preferences), can still be considered in the collaborative operation of the vehicle, though the passenger is not considered a team member. A distinction would be that the processor (e.g., VATM processor) would not regularly, or as frequently, consider the preferences, data, or needs about, of, or from the passenger, provide information to the passenger, request or receive input from the passenger regarding team-related functions, and/or other.

Operations 406 and 408 are performed with respect to each passenger.

Following operation 408, or in response to a negative determination at operation 406, flow of the algorithm proceeds to decision diamond 410, whereat the processor determines whether there are any other accounts associated with the UTM. As referenced above, such other accounts can include a present or non-present parent account, a supervisor account, a governmental authority or agency, a remote service center server (e.g., OnStar®), the like, or other. The other accounts can thus include persons and/or automated devices.

The operations 410, 412 can include functions like those of steps 406, 408, but with respect to the one or more other accounts. The operations 410, 412 can include, e.g., determining whether the other account(s) is established or should be established and linked to the UTM account, and whether the account(s) is or should be considered as a member of the UTM-VATM collaborative team. And even it is not, the processor (e.g., VATM processor) can still consider input from the associated entity/ies, whether requested or pushed to the processor, in performance of the team functions.

As with non-team-member passenger accounts vis-à-vis team-member passenger accounts, one difference, between a non-team-member other-entity account and a team-member other-entity account, would be that the processor (e.g., VATM processor) would not regularly, or as frequently, consider preferences, data, or needs of, about, or from the other entity, provide information to the other entity, request or receive input from the other entity regarding team-related functions, and/or other.

The method 400 can be repeated or end 413.

V.C. Operation of Collaborative System—FIG. 5

As provided, FIG. 5 shows an exemplary method 500 for performing general functions of the collaborative team framework, using the team or participating team members determined in the method 400 illustrated in FIG. 4, according to embodiments of the present technology.

The method 500 begins 501 and flow proceeds to decision diamond 502, whereat the processor determines whether a collaboration trigger has occurred. The collaboration trigger can include, for instance, determining that a driver of the vehicle has indicated a desire to enter a collaboration vehicle mode. As provided the driver may have already been identified by the vehicle agent team member (VATM) as being associated with a user-team member (UTM) account.

The vehicle and VATM thereof can be configured to receive such indication from the driver in any of a variety of ways, such as via a collaboration, or team-function hard button or switch, via a voice detection and interpretation sub-system (e.g., the microphone-speaker system), or a touch-screen button or other indicator. Any of the triggering interfaces (camera, microphone, button, switch, etc.), as with any interface described herein, can be considered one of the components linked to processor in the schematic illustration of FIG. 1.

In one embodiment, the collaboration trigger includes simply starting a motor or engine of the vehicle, or just powering on the vehicle such as by turning the key to an on position.

The collaboration trigger can be associated with all team-based applications of the vehicle or just one or more established team-based applications. The association can be determined by the VATM in any of many ways, such as according to a default rule, a preference pre-set by the user to the VATM (e.g., always upon initial trigger (e.g., vehicle start, or collaboration button press) launch collaboration mode for all established team-based applications, or rather for just pre-identified applications, such as just for a team-oriented adaptive cruise control (ACC) system and/or a team-oriented HVAC system.

Another example collaboration trigger is a triggering signal received at the processor (e.g., VATM or remote service center processor). The triggering signal can be received, e.g., at the VATM processor from a server or other computer of a remote service center (e.g., OnStar®), or from computer or other automated system (E.g., phone system, smart-phone application, etc.), such as from a parent or supervisor of the driver associated with the UTM.

In one embodiment, the collaboration trigger includes a triggering condition. An example triggering condition is a location of the vehicle, such as the vehicle being near home, away from a home area (e.g., home metropolitan area), on the highway, in the city, etc.

Another example triggering condition is a vehicle-operation condition. The vehicle-operation condition can be, for instance, the vehicle being driven at a certain speed, cruise-control being activated, HVAC being activated, the HVAC being adjusted by the driver or passenger, the HVAC being adjusted in a certain manner, an in-vehicle temperature, an in-vehicle temperature distribution, an ambient (extra-vehicle) temperature or weather report, an ambient humidity, the radio being activated, the like, or other. In one embodiment, the VATM is configured so that a certain vehicle-related condition triggers activation of only a certain one or more team-oriented applications.

The UTM activating or adjusting the vehicle HVAC can be a vehicle-operation condition triggering the collaboration mode with respect to only the team-oriented HVAC, or of the TOHVAC along with one or more other team-oriented applications. Similarly, the UTM activating cruise control can, for example, be a vehicle-operation condition triggering the collaboration mode with respect to only the team-oriented ACC system (or, TOACC system, or TOACCS) and a team-oriented navigation system.

Responsive to a negative determination at decision 502, e.g., a collaborative trigger is not determined present at the time, flow can return along path 503 to re-performing the decision 502, or flow of the algorithm can hold at the step 502 until a trigger is determined present Responsive to a positive determination at decision 502, the VATM at operation, or routine, 504 enters the collaboration mode in connection with the one or more respective vehicle application associated with the trigger, as described above.

In the collaboration mode, flow of the algorithm proceeds to operation, or sub-routine 506 whereat the processor performs one or more collaborative functions, and related pre- and post-communications and processing.

It is noted, as an aside, that some collaborative functions are not viewed as relating to a corresponding or analogous non-collaboration function, while some collaborative functions can be seen as related to a corresponding or analogous non-collaboration function.

The operation or routine 506 of performing one or more collaborative functions can include a plurality of sub-operations or sub-routines. In various embodiments, the sub-routines include any of the following six (6) sub-routines: (i) pre-action-determination processing (508 in FIG. 5), (ii) pre-action-determination communications (510), (iii) action determination (512), (iv) action execution (514), (v) post-action-execution communications (516), and (vi) post-action execution processing (518). Each of these routines are described further below in turn.

V.C.i. Pre-Action Determinations and Processing

As part of the operation 506 of performing one or more collaborative functions, the processor performs an operation 508 of collecting and using data need to identify what action or actions should be taken, and how, in connection with the one or more applications for which the team mode is activated.

The VATM is configured (e.g., computer-readable code outlining aspects of the algorithm is such) to based on its programming determine actions needed, and how the actions should be performed, based on data such as UTM preferences, VATM preferences or defaults, UTM input, vehicle conditions, vehicle location, and data related specifically to the application(s) for which the vehicle is in team mode.

Relevant data can include historic data regarding team performance. Historic data includes, e.g., previous decisions made by the user in the same, similar, or related circumstances.

Relevant data can also include, for instance, a current temperature of the vehicle and UTM-preferred temperature of the vehicle in connection with team-oriented HVAC.

The VATM may according to its programming determine that data is needed from the UTM or other team member. The VATM requests such data or otherwise operates to obtain the data needed. The VATM may, for instance, require or recognize as helpful (e.g., desire) data from the driver, such as a target goal, whether the user would like to decrease driver zone temperature, etc. In that case, the VATM would communicate a request for the data to the user, such as via the vehicle speaker or display system referenced above.

The required or desired data can also be that accessible from another entity or party, such as a weather service, a traffic authority, or a parent of the driver. As provided above, such entity or party may or may not be a member of the team. The processor proceeds to operate toward obtaining the needed data.

The pre-action determinations and processing can also include updating system data, such as user or system preferences, or system models (e.g., user model, mental model, etc.).

V.C.ii. Pre-Action Communications

As part of the operation 506 of performing one or more collaborative functions, the processor performs an operation 510 of performing pre-action communications.

In addition to any of the communications described in the immediately preceding sub-section, the VATM here may initiate or otherwise participate in communications with one of the team members. Some communications can be considered as falling under this pre-action communications sub-routine and also under the previously-described pre-action determinations sub-routine.

According to one embodiment, these communications are focused on providing polite advance notice to the UTM of an action determined to be taken. The VATM may determine tentatively an action to take or determine finally an action to take. The VATM can communicate whether the determination is tentative, e.g., a proposed or suggested course of action, or supervisory.

As an example of a suggestion, the VATM may propose to the UTM that the VATM cause the vehicle to slightly decrease temperature and increase the fan setting by one step, or advise that the VATM will do so unless the user would prefer not to, etc.

As an example of a supervisory communication, the VATM may advise the driver that the VATM is or will be activating a defrost function, such as based on a determination that the front window is fogging or frosting, and/or that conditions (e.g., weather) are likely to cause fogging or frosting. As described elsewhere, herein, also, the VATM can also, supporting team principles such as the transparency and trust building, provide an explanatory communication to the UTM explaining why it is making a suggestion or supervisory action.

Communications to the processor from the UTM can include inquiries and statements. For example, the UTM may enquire, "how do I defrost quickly?" or "how do I decrease humidity?" Or advise, "in such raining and humid conditions, please always activate the defrost."

Or the VATM may enquire, e.g., "would you prefer to take manual control?" Or advise, "my sensors are having some trouble, please continue manually." Or advise, "you have set the temperature above your preferred temperature for these conditions (e.g., time of year, outside temperature); if you want to resume my (vehicle) automatic control, please say or press resume."

In some embodiments, the VATM is programmed to, as part of pre-action communications, communicate with entities or parties other than the driver. Example parties include a passenger, a traffic authority, parent, police, hospital or other medical entity, etc. As provided, such entities and parties may or may not be members of the collaborative team.

The VATM is further programmed so that, in communications to the team members, the VATM uses rules or protocols prescribing pre-sent manners of communication. As provided herein, the VATM preferably communicates in ways—e.g., timing, tone, and content—that is respectful, socially pleasing or pleasant, intimate, rather than coarse, etc. The rules or protocols are in some embodiments programmed into the VATM by a designer or maker of the VATM system, or vehicle on a whole.

As with all aspects of the methods described herein, the rules or protocols for this part are in various embodiments configured with consideration given to (e.g., based on, or relate to) the precepts outlined herein, including, for example, any combination of the data items described herein—e.g., any of the seven (7) teamwork or collaboration features, any of the data outline in connection with the four (4) team-oriented modules, including the four (4) models therein, and/or any of the general concepts described further below.

The rules or protocols, here regarding pre-action communications can be based or relate, for instance, at least in part on the data items relating to building trust, mutual respect, transparency, responsiveness, established and agreed-upon communication and language preferences and protocols, and healthy, effective, and efficient feedback loops.

The rules or protocols here can call out timing, such as providing information to the UTM relatively well in advance of the action to be taken, or with as much time as reasonable and possible to allow the UTM to provide feedback, such as a reply communication agreeing to or disagreeing with a VATM proposal or inquiry.

As provided, the rules or protocols, depending on the circumstances, can include one or more reasons explaining to the UTM basis(es) for VATM determinations. The explanation can include support for a presented proposal—e.g., "activating defrost because condensation is forming on the window (or, because condensation is likely under the conditions)." Or the explanation can relate to particularities of the current weather, particularities of the interior vehicle conditions, and/or etc.

The rules or protocols, here regarding pre-action communications can again be based or relate, for instance, at least in part on the data items relating to building trust, mutual respect, transparency, responsiveness, intimacy, satisfaction, and healthy, effective, and efficient feedback loops.

The rules or protocols also can prescribe that the VATM communicate with the UTM in an appropriate tone. The tone in some embodiments, is preferably generally or usually gentle or gentile, but can be more direct based on the circumstances, such as if determined needed to gain the attention of a driver who is apparently drowsy or experiencing some sort of medical episode resulting in delayed UTM response.

V.C.iii. Action Determination

As part of the operation 506 of performing one or more collaborative functions, the processor performs an operation 512 of determining the action. The determination 512 is based on the data collected in the pre-action determinations and communications, the processor (e.g., VATM or other processor) determines how to perform one or more pre-determined actions. Some computation may be done off line and some online.

The VATM may in this operation 512 consider feedback from the UTM, other members, or other parties or entities, in determining whether an initial or preliminary action, whether presented to any such parties, should be a final action. For instance, the VATM may in the first sub-routine 508 determine to propose to the UTM that the VATM decrease cabin temperature to increase driver and passenger comfort, in the second sub-routine 510 communicate the proposal to the UTM and receive a disagreeing reply, or counter instruction or suggestion, from the UTM indicating that the user would prefer that the temperature remain the same and that the fan be turned up, instead, or that the user or VATM open one or more windows, instead. Here in the action determination sub-routine 512, the processor thus considers the feedback and perhaps any supporting data (e.g., user preferences, passenger preference(s), weather, interior temperature, body temperature and/or other biometric characteristics of the driver or passenger, etc.) and determines how to adjust the vehicle (e.g., temp, fan, windows, etc.).

As with all aspects of the methods described herein, the rules or protocols for this part, regarding action or function determination, are in various embodiments configured with consideration given to (e.g., based on, or relate to) the precepts outlined herein, including, for example, any combination of the data items described herein—e.g., any of the seven (7) teamwork or collaboration features, any of the data outline in connection with the four (4) team-oriented modules, including the four (4) models therein, and/or any of the general concepts described further below.

The rules or protocols, here regarding action or function determination can be based, for instance, at least in part on the data items relating to building trust, mutual respect, and shared authority. The decision is of course also based on safety considerations when appropriate.

The VATM can, in any event, explain the final decision in the post-action communication sub-routine 516, described further below, V.C.iv. Action Execution As part of the operation 506 of performing one or more collaborative functions, the processor performs an operation 514 of executing or performing the action, or function.

As referenced above, the processor can determine that more than one collaborative function or action should be performed sequentially or in parallel, or some sequentially and some in parallel or generally simultaneously.

V.C.v. Post-Action Communications

As part of the operation 506 of performing one or more collaborative functions, the processor performs an operation 516 of participating in post-action communications.

As provided, the VATM is programmed to, in circumstances that are deemed appropriate according to the algorithm, user-preferences, or other basis, to communicate with the UTM or other entities at any time, including during or after action performance.

The communication can explain to the UTM, for instance, a level of success of the action (e.g., "because there are numerous occupants, the temperature setting was insufficient to keep the car at the preferred cabin temperature"), proposals for the future (e.g., "next time we'll consider the number of passengers when calculating a temperature setting"), inquiries of the UTM (e.g., "was that a pleasant HVAC setting for you" or "did you like the effects of that HVAC-setting change?"), etc.

The VATM can also provide communications to appropriate entities or other parties, whether team members, such as a parent, a school, a traffic authority, etc. (e.g., advising a hospital that a vehicle of a UTM having a medical emergency has been pulled over and parked, and where, or is on its way to the nearest hospital, etc.).

The communications can include the VATM receiving feedback, instructions, or inquiries from the UTM, or other party or entity, and responding accordingly.

The rules or protocols for this part, regarding post-action communications, are in various embodiments configured with consideration given to (e.g., based on, or relate to) the precepts outlined herein, including, for example, any combination of the data items described herein—e.g., any of the seven (7) teamwork or collaboration features, any of the data outline in connection with the four (4) team-oriented modules, including the four (4) models therein, and/or any of the general concepts described further below. The rules or protocols, here regarding post-action communications can be based or relate, for instance, at least in part on the data items relating to building trust, mutual respect, transparency, responsiveness, intimacy, satisfaction, established and agreed-upon communication and language preferences and protocols, and healthy, effective, and efficient feedback loops.

The rules or protocols also can prescribe that the VATM communicate with the UTM in an appropriate tone. The tone in some embodiments, is preferably generally or usually gentle or gentile, but can be more direct based on the circumstances, such as if determined needed to gain the attention of a driver who is apparently drowsy or experiencing some sort of medical episode resulting in delayed UTM response.

V.C.vi. Post-Action Processing

As part of the operation 506 of performing one or more collaborative functions, the processor performs an operation 518 of performing processing after the determined collaboration function or action is taken.

The processing in one embodiment includes establishing a user decision or instruction for future use in like circumstances. If the user, for instance, suggested, requested, or agreed to perform a certain action, such as setting the cabin temperature to a certain low temperature when a certain two passengers are in the care, the VATM will remember the condition and setting. The preference may be qualified, such as by a location, time of year, time of day, relation to an event, etc.—for example, the setting the temperature to a certain level following a sporting event in which the driver participated.

In one embodiment, the VATM advises the UTM of some or all such new preferences being or having been stored. In a particular embodiment, the VATM advises the UTM that the new preference will be stored unless the UTM disagrees. Making new preferences, or amending a preference, as such can be referred to as adapting, or an adaptation function.

This arrangement, whereby new proposed preference presented by the VATM will become a stored new preference unless the UTM communicates disagreement, can also be a system default. In this case, the VATM would not need to remind the UTM in connection with each new preference being stored that the user can provide a veto. Such default setting can be communicated to a user with other commitments, communication bases, etc.

The rules or protocols for this part, regarding post-action processing, are in various embodiments configured with consideration given to (e.g., based on, or relate to) the precepts outlined herein, including, for example, any combination of the data items described herein—e.g., any of the seven (7) teamwork or collaboration features, any of the data outline in connection with the four (4) team-oriented modules, including the four (4) models therein, and/or any of the general concepts described further below. The rules or protocols, here regarding post-action communications can be based or relate, for instance, at least in part on the data items relating to building trust, mutual respect, transparency, intimacy, satisfaction, and healthy, effective, and efficient feedback loops.

The post-action processing can also include updating system data, such as user or system preferences, or system models (e.g., user model, mental model, etc.).

Flow of the algorithm proceeds to repeat acts, as indicated by arrow 520, or proceeds to repeat the entire method or to end 521.

V.D. Operation of Collaborative HVAC System—FIG. 6

As provided, FIG. 6 shows a method 600 for performing functions of the collaborative team framework in connection with a particular, example, application, being a heating, ventilation, and air-conditioning (HVAC) system, according to embodiments of the present technology.

Before describing the method in detail, some general aspects of the method are described.

Conventional HVAC systems are not aware of its user, do not react to user conditions, passenger conditions, outside-vehicle conditions, user preferences, passengers preferences, etc., and do not alert the user based on real-time situations and personal driving patterns of the user. Conventional HVAC has a constant behavior pattern, reacting to all users and settings in the same way. These characteristics lead to user confusion, uncertainty, and low use of HVAC, at least as compared to team-oriented HVAC.

Collaboration of the team-oriented HVAC is achieved by allowing and promoting bi-directional communications between at least the driver (UTM) and the VATM. The collaboration is promoted by transparency of critical values between the team members, and by adapting team-oriented HVAC behavior to repetitive patterns of driver behavior.

The collaboration also includes adaptation. Adaptation is achieved by collecting information on UTM settings and situational conditions—e.g., road conditions, location, weather. Particular to team-oriented HVAC also include processing temperature values, fan settings, defrost level, window or sunroof/moonroof settings, and/or etc., which can be adjusted to keep the user driving without disengaging the system. These and related aspects are described further below.

The VATM maintains a model of constraints it encounters, e.g., as a result of weather, intra-vehicle conditions (e.g., number of passengers), and HVAC setting provided by the driver. The VATM system behavior is configured to be responsive to UTM requests and other feedback, e.g., regarding temperature, fan, and/or window settings (how far open/closed), with apt consideration to VATM constraints.

The VATM plans and coordinates, given the constraints and UTM requests and other feedback, and is configured to communicate opportunities to the UTM—e.g., provide advice to the UTM regarding certain suggested HVAC settings given these constraints—e.g. when the system needs to cool the cabin.

The VATM may also communicate reasons for its actions, e.g., why it cannot get to a desired low temperature, and can communicate a corrected or new target HVAC setting—e.g., instead of just a lower speed, increase fan and/or decrease humidity. In such ways, the VATM behaves responsively by showing its intentions and plans to its user.

In another example, if vehicle sensors are not working, the VATM automatically transfers control to manual as gracefully as possible, and communicates the transfer to the UTM.

The VATM can also extend HVAC to include adaptation e.g., modifying system operation based on present or current operations and conditions. For instance, as provided above in connection with the method of FIG. 4, the VATM may establish as a new system setting or preference, a present decision or pattern of decisions made by the UTM, for use in similar future situations. The decision or pattern can include, e.g., conditions under which the UTM engages or disengages the team-oriented HVAC, or certain settings that the UTM sets the team-oriented HVAC to.

As further example of a noticed behavior or pattern, the VATM may recognize that by regularly adjusting the HVAC settings, the UTM will tend to remain engaged (e.g., maintain team interactions and/or continue TOACC driving) for longer periods, drive safer, etc.

In one embodiment, as referenced above in a few places, the VATM can, in response to suggesting to the UTM a change—e.g., change in temperature and/or fan speed, and the user replying approving the change, or not responding negatively, store the behavior for use in a like future situation automatically.

Figure 7:
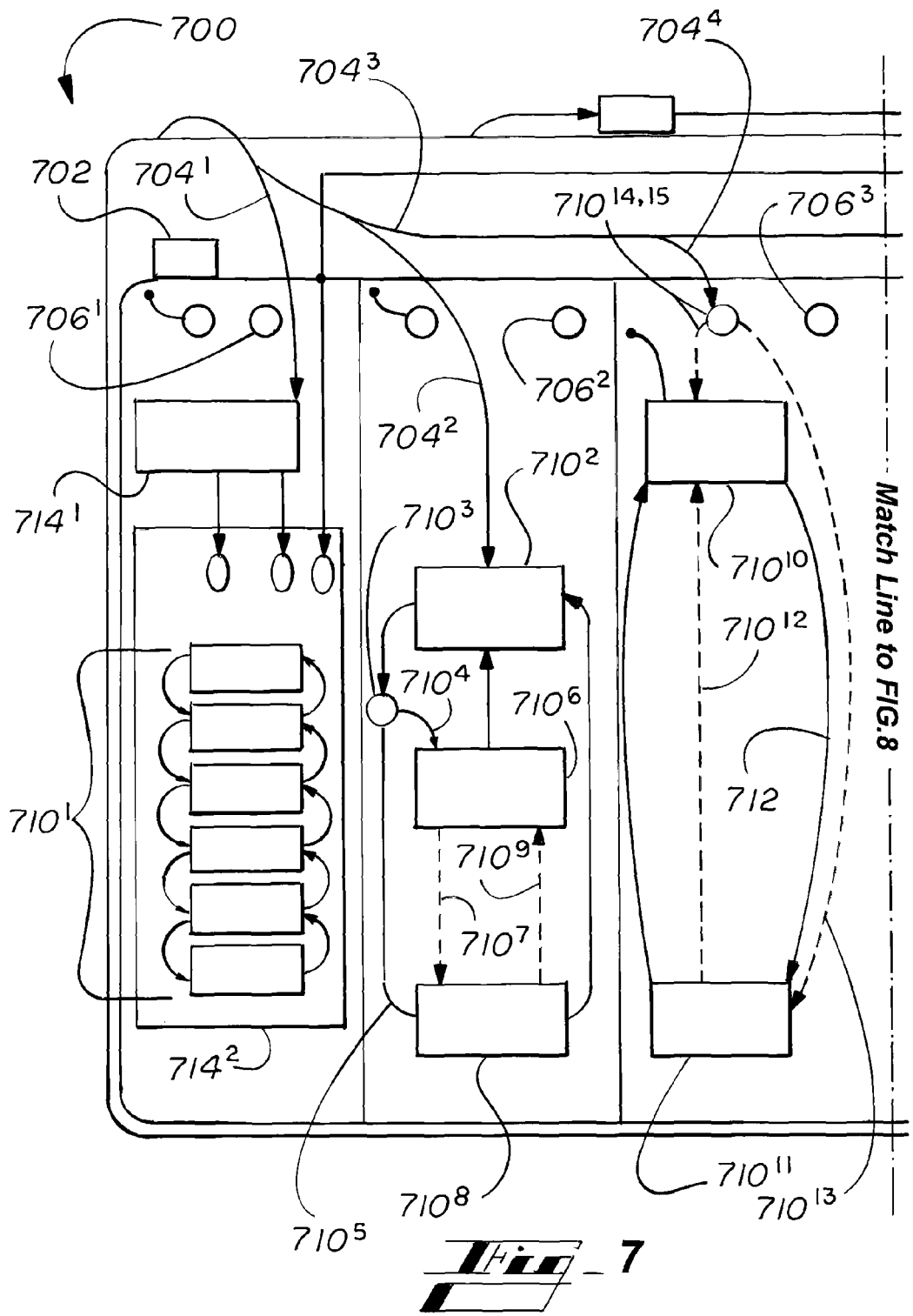
FIGS. 7-8 shows schematically a model of a collaborative HVAC system and select functions associated therewith called out for description below in connection with the algorithm of FIG. 6.

The method 600 of FIG. 6 is described below with reference to the illustration of FIG. 7. FIG. 7 shows schematically a model 700 of a collaborative heating, ventilation, and air-conditioning (HVAC) system and functions associated therewith.

Figure 8:
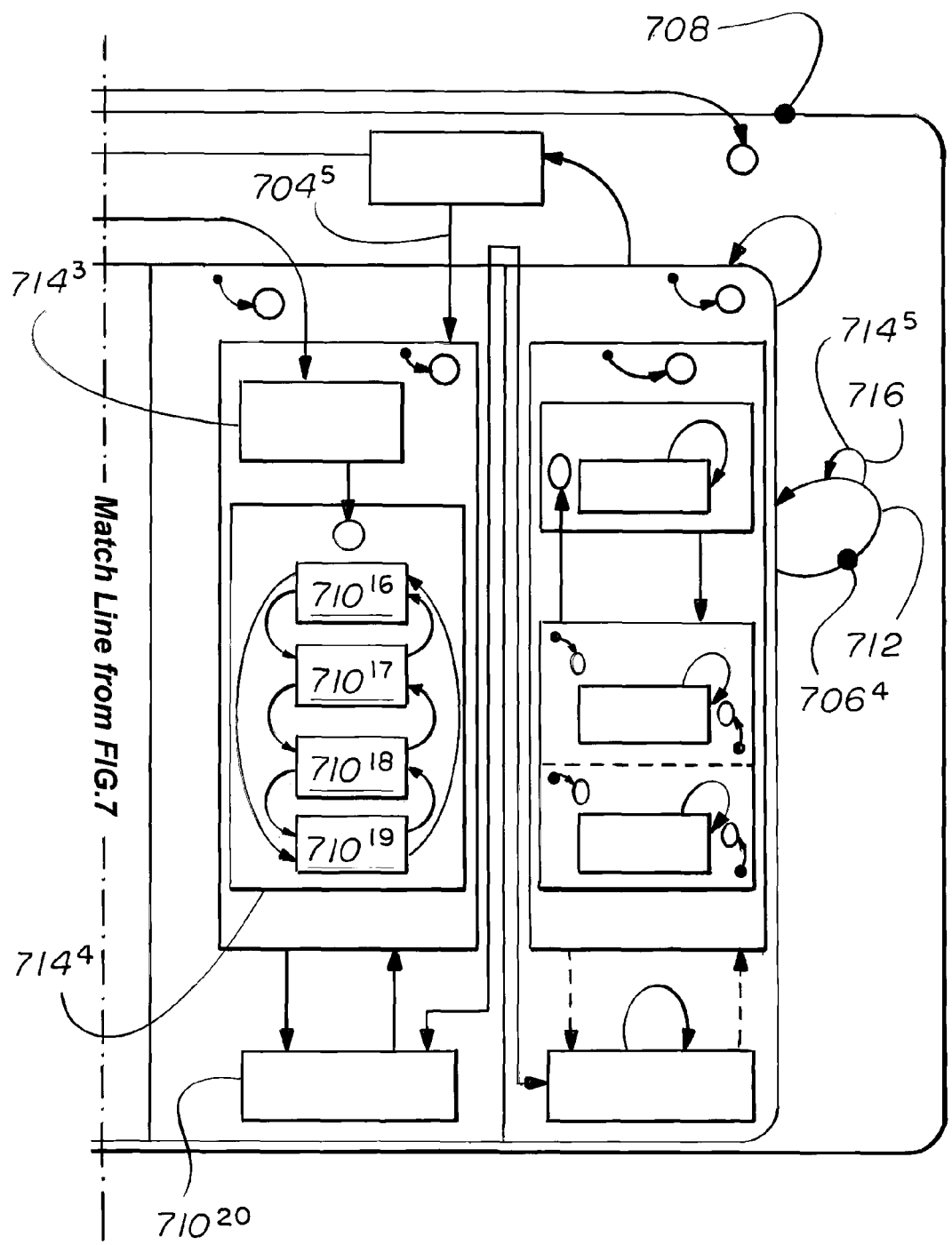

The method 600 of FIG. 6 is described below with reference to the illustration of FIGS. 7-10. FIGS. 7-8 show schematically a model 700 of a collaborative HVAC system and functions associated therewith. The representation of the views of these two figures is singular, and shown by two figures only to more clearly show the details therein. The same applies to FIGS. 9-10.

Figure 9:
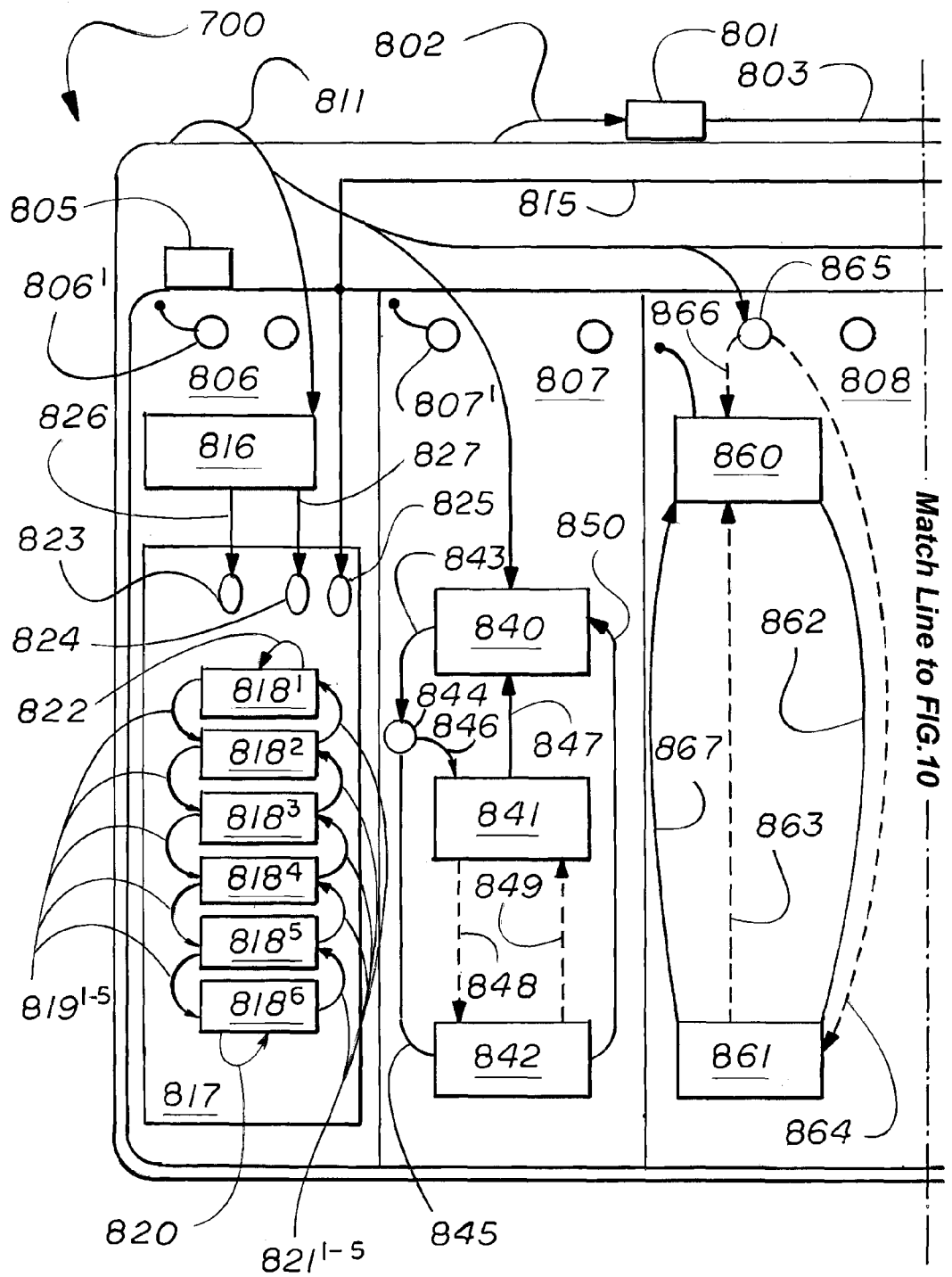
FIG. 9-10 shows the model of FIGS. 7-8 with the select and other functions called out for further description below.
Figure 10:
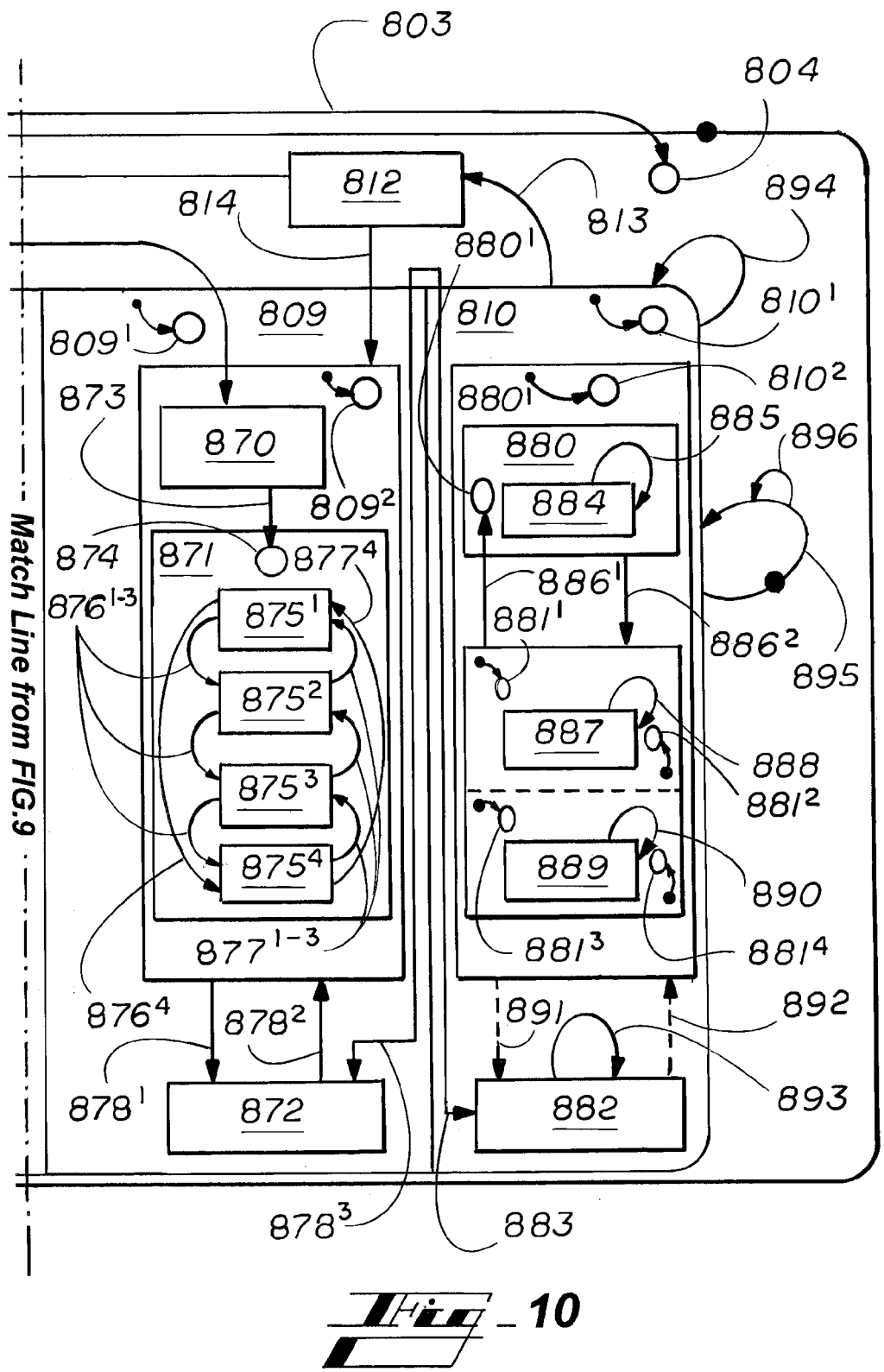

FIGS. 9-10 show the same model 700 of FIGS. 7-8, but separately in order to identify features of the model 700 in support of the description of the method 600 of FIG. 6 and references to FIGS. 7-8. As shown in FIGS. 9-10, the model 700 includes:

Engine-on item 801
Ignition-off reference 802
Ignition-on reference 803
System (H) item 804
System on item 805
Fan section 806
Fan section (H) item 806$^1$
Compressor section 807
   Condition 1: in DEFOG or DEFROST
   Condition 2: neither DEFOG nor DEFROST
Compressor section (H) item 807$^2$
Air-source section 808
Air-delivery section 809
First air-delivery (H) item 809$^1$
Second air-delivery (H) reference 809$^2$ (re non-defrost sub-section)
Zone section 810
Auto references 811
Power_off item 812
   Air delivery in manual; Air source is fresh air; Temp setting is available
Power-off reference 813
Power-on reference 814
Fan +/−reference 815
Auto sub-section 816

Manual sub-section 817
Fan stages 818$^{1-6}$
Increase-fan-stage step references 819$^{1-5}$
Max-fan-stage return reference 820
Decrease-fan-stage step references 821$^{1-5}$
Min-fan stage return reference 822
Input 823 (of manual sub-section of fan section)
Additional input 824 (of same)
(H) reference 825 (of same)
   (H), in some embodiments, for human, referring to human activity or human-related activity.
Decrease-fan-stage signal 826 (from auto sub-system 816)
Increase-fan-stage signal 827 (from auto sub-system 816)
Compressor-on (indicator-on) item 840
Compressor-off (indicator-off) item 841
Compressor-on (indicator-off) item 842
First air-conditioning button reference 843
(C) item 843 (of compressor section 807)
   (C), in some embodiments, for compressor, referring to compressor or compressor-related activity.
First route reference 845
Second route reference 846
Second air-conditioning button reference 847
Enter references 848 (enter RECIRC; enter DEFROST; enter DEFOG)
Exit references 849 (exit RECIRC; exit DEFROST; exit DEFOG)
Third air-conditioning button reference 850
Fresh-air item 860 (of air-source section 808)
Recirc-air item 861
Recirc-on reference 862 (Regarding panel or floor/panel)
Enter references 863
   Enter DEFROST; enter FLOOR or DEFOG; normal temp (auto); enter COMPRESSOR OFF)
Hot-temp reference 864
(C) reference 865 (of air-source section 808)
Normal-temp reference 866
Recirc-off reference 867
Auto sub-section 870 o(f air delivery section 809)
Manual sub-section 871
Defrost sub-section 872
mode change reference 873 (mode increase/decrease; +/−)
(I) item 874 (input; of manual sub-section 871)
Air-delivery outlet selections 875$^{1-4}$ (Defog, Floor, Floor/Panel, Panel)
First change-outlet selections 876$^{1-4}$
Second change-outlet selections 877$^{1-4}$
First defrost-on reference 878$^{1}$
Defrost-off reference 878$^{2}$
Second defrost-on reference 878$^{3}$
Single-zone sub-section 880
(I) item 880$^{1}$ (input; for single-zone sub-section 880)
Dual-zone sub-section 881
First (I) item 881$^{1}$ (input; for dual-zone sub-section)
First (H) item 881$^{2}$ (for dual-zone sub-section)
Second (I) item 881$^{3}$ (input; for dual-zone sub-section)
Second (H) item 881$^{4}$ (for dual-zone sub-section)
Temp-control for Defrost sub-section 882
Defrost-on reference 883
Driver's (global) temp-setting item 884 (single-zone mode)
Driver's temp +/−885
Passenger-zone-off 886$^{1}$ (from dual to single-zone mode)
Passenger-zone-on 886$^{2}$ (from single to dual-zone mode)
Driver's temp-setting item 887 (dual-zone mode)
Driver's temp change reference (+/−) 888
Passenger's temp-setting item 889
Passenger's temp change reference (+/−) 890
Enter DEFROST 891
Exit DEFROST 892
Passenger's/driver's global temp change (+/−) reference 893
Set temperature reference 894
Current temperature reference 895
Current-temp trend reference 896

These and other features of the model 700 are described further below with reference to FIGS. 7-8 and the method 600 of FIG. 6.

With continued reference to FIG. 6, the method 600 begins 601 and flow proceeds to operation 602, whereat the processor receives an indication from the user to initiate collaborative activity. In one embodiment the indication includes the UTM pressing an on button 702 of the HVAC, or more particularly, in some cases, a team or collaboration button.

In one embodiment, the indication is meant and interpreted by the VATM to communicate UTM intention to be bound into collaborative team operations. The VATM can in response consider the UTM and VATM to have entered into an agreement, or contract, to the team relationship. The contact may be actual, communicated to the UTM, and include, e.g., clauses providing that, should the UTM become insufficiently responsive and respectful of the relationship (e.g., not responding to or ever accepting VATM inquiries or recommendations, or e.g., in an emergency situation), the VATM will either quit the relationship altogether or take full autonomous control of the operations.

In one embodiment, these such consequences of the agreement are made explicit—e.g., if the VATM determines that a much more efficient manner of HVAC operation is possible, with slight or no change degradation to driver/passenger comfort, the change will be made. As another, non-HVAC-specific, example, if the UTM is having a heart attack, the VATM takes fully automatic control until it reaches a safe stopping spot and the car may also contact emergency services.

If the UTM has stated that he does not desire such a close contract with the VATM, the VATM may operate under looser standards, but may still quit if the UTM does not respond sufficiently under the looser standards of the agreement. The commitment described is indicated in FIG. 7/8 by reference numeral 704.

Following activation of the system at step 602, the team-oriented HVAC system can at block 604 operate in any of a STANDBY, AUTO, or a MANUAL mode. In the STANDBY or MANUAL state, the UTM manually controls HVAC operation. However, the protections discussed above are, if system settings call for it, still in place. For example, when in STANDBY, and the UTM is having a medical emergency, the VATM will take control as needed, e.g., of vehicle speed, etc., toward safely parking the vehicle or directing the vehicle to a hospital, etc.

Flow of the algorithm proceeds to block 606, whereat the VATM transitions from the STANDBY mode or MANUAL mode to an ACTIVE mode or AUTO mode.

At block 608, the VATM in this portion provides one or more of a variety of communications. The VAT may, e.g., communicate (e.g., displays) to the UTM a current state of the VATM—i.e., ACTIVE. In one embodiment, while in STANDBY and/or ACTIVE modes, the VATM communicates consequences of engagement of the collaborative HVAC operations, such as settings for temperature, fan, etc.

If the VATM has a-priori information about UTM behavior or preferences —e.g., a UTM temp setting preference, this information could be presented to the UTM as well. Such information share promotes transparency, common ground, and other advantages of collaboration outlined herein.

At block 610, the VATM processes other settings, preferences, or conditions that may affect team-oriented HVAC operation. The VATM, e.g., may consider any history of interactions and operation in the team, between the VATM and UTM, and any related conditions. The VATM can also consider any relevant attributes of the team agreement.

The VATM may also here process any information on hand or otherwise available related to recommendations already provided to the UTM and/or to other drivers, perhaps in like circumstances. Regarding providing advice regarding other drivers, the VATM can also communicate to the UTM any relevant similarities between the UTM and the other driver(s) and between a present condition (e.g., weather, location) and the similar other conditions.

All information can be considered part of the model of the team-oriented HVAC system.

At block 612, the VATM determines whether any predetermined settings or courses of action should be modified based on present conditions. The conditions may include, e.g., environmental conditions (e.g., rainy day).

An example modification is changing a previously determined setting or recommendation for passenger-zone temperature, or economy setting/trigger.

At block 614, the VATM communicates any modification made to the UTM, in the interest of transparence, responsiveness, team-commitment, promoting trust, and any other related team-based attributes described herein. The communications, as all communications to team members, are provided in the pre-determined common language and modalities preferred, as described above in connection with other communications (e.g., in connection with the method 500 of FIG. 5).

The potential and opportunity for the VATM to provide advice and recommendations to the UTM as to the activation of the team-oriented system, for instance, is depicted in FIG. 7/8 by reference numerals $706^{1-4}$. The interactions can be referred to as coordination. A similar circle is indicated in FIG. 7/8, at a transition from system OFF to ON, by reference numeral 708, which can be referred to as a fulfillment.

At block 616, the VATM receives indication from the UTM of a desire speed. In the interest of transparency and other collaborative properties, the VATM at block 618 communicates the desired speed(s) set to the UTM. In this way, the UTM is confided, more confident, knowing that the VATM received, stored, and acknowledged the limit set by the UTM.

At block 618, if the VATM needs to for some reason drive at a different, e.g., slower, speed, the UTM should understand why, and/or the VATM will communicate to the user the reason and that the VATM when return to the UTM set speed when appropriate and, perhaps, what that appropriate condition is. The VATM may also in the interim advise the UTM what the interim settings are—e.g., temporary lowered speed setting.

The VATM at block 620 notes any further or new appropriate constraint(s) it identifies or encounters, for example, as a result of traffic, road conditions, and determines how they may affect UTM settings, e.g., UTM speed and gap values. The VATM can also communicate any further changes, and underlying reasons to the UTM.

At block 622, the VATM is responsive to any UTM requests, such as regarding speed and gap settings or temporary modifications thereto based, e.g., on constraints currently determined relevant by the VATM. Responsiveness promotes collaboration concepts including those described herein, including transparency, responsiveness, generally, trust, etc.

At block 624, the VATM communicates any recommendations or opportunities to change a setting to the UTM. An example is providing the UTM with advice regarding speed and fuel economy. This transparency is indicated in FIG. 7/8 by reference numeral $710^{1-20}$, indicating relevant states of the VATM.

Relevant temperature responsiveness is indicated by reference numeral 712.

And relevant collaborative communications are indicated in FIG. 7/8 by reference numeral 714, referencing a temperature trend at $714^5$, adjacent indication $706^4$.

At block 626, the VATM processes and learns, based on the afore-mentioned information, about the UTM and UTM preferences, such as regarding temp settings, fan settings, and engagement and disengagement patterns demonstrated, etc. The VATM, e.g., determines based on the learning how to better utilize the team-oriented HVAC effectively and efficiently, including ways to keep the TOHVAC engaged for longer periods of time, toward goals such as promoting more economical and/or efficient use of the HVAC—e.g., increasing a fan setting instead of raising temperature, or instead of raising temperature so much, when the VATM has determined the same to be more economical and/or efficient without compromising vehicle occupants.

In some embodiments, the collaborative team (e.g., VATM and/or UTM, etc.) considers in its determination and actions, vehicle battery state (e.g., charge level), fuel consumption (e.g., rates of use (e.g., fuel economy), levels, etc.) to improve vehicle operation or life, such as by improving fuel economy, management, and/or extending batter range or life.

The VATM, based on such learning, which can consider various environmental conditions (e.g., weather, sensor data regarding exterior or outside of vehicle), determines and provides advice to the UTM regarding TOHVAC, such as regarding changes to the temperature or fan values that are called for in certain future situations to coordinate and plan more comfortable and/or more economical and efficient trips.

At block 626, the VATM, as in all conditions, respects the importance of communicating VATM operations under the team framework to the UTM. The communication is indicated in FIG. 7/8 by an intra or self loop and reference numeral 716.

The team-oriented HVAC is also configured with protocols or processes regarding disengagement of the system. At block 628, the VATM receives indication that the UTM has indicated a desire to disengage automatic control, such as by selecting a cancel or off button. The VATM disengages the team-oriented HVAC in response. In one embodiment, though leaving the automatic mode, the VATM remains ON in the background. Temp, fan, etc. settings information, which remains set in the VATM, in some embodiments still needs to be made transparent to the UTM in an appropriate manner (e.g., timing, modality, etc.). In this state, the VATM can still monitor UTM actions, in connection with related conditions (e.g., weather, interior conditions, etc.), and store the monitored actions and conditions for future use in team operations.

The method 600 can be repeated or end 630.

VI. Additional Concepts

The disclosure now re-states principles and concepts described above on which the team-oriented automated system is based and can operate, and describes some related ancillary principles and concepts.

The collaborative human-machine-interface (HMI) concepts described herein can be applied to any one or more of numerous systems. While the technology is not limited to use in connection with automobiles, or even vehicles, generally, as referenced above, example vehicle systems and sub-systems into which the present collaborative framework can be implemented include ACC, HVAC, navigation, security (including cyber-security and lock/start/remote interaction with the car by WIFI/internet/mobile), power management (including fuel efficiency or other fuel-related considerations, battery state of charge (SOC), environmental considerations, hybrid, fuel cell, gear shifts, modes of drive), environmental considerations outside of power management, navigation (e.g., based on GPS or other, e.g., social-media based, vehicle-to-vehicle (V2V) interaction, relation to land marks such as cell stations or other infrastructure (V2I)), management and user interaction with location-based services (LBS; such regarding stores, services, coupons), help (e.g., electronic user manual and additional help functions while driving), radio and other means of entertainment, web management (e.g., e-mail, short-message system (SMS) messaging, social networking and social interaction), learning systems (e.g., educational system facilitating user learning about environment, museums, touristic information), vehicle health management system (VHMS), phone, V2V connectivity, automation features such as ACC, lane centering (LC), lane change (LX), automated steering related to semi-autonomous driving, general interaction with vehicle (e.g., relating to operation of windows, wipers, lights, headlights, tires, engine), radio or other audio-related settings or preferences, and seat belt operation (driver and/or front or back-seat passengers).

In each implementation (i.e., for any of the uses, or applications, described herein above), the seven (7) teamwork or collaborative features of the cooperative HMI described herein are applied. More particularly, for example, the cooperative system can in each instance be initiated by means of a contract between the automated system, or vehicle agent team member (VATM), and the user team member (UTM), which relates to the first of the seven (7) teamwork or collaborative features.

In addition, the VATM and resulting teams will be built upon the three (3) modules, including the four (4) described models, including of user, of machine, of machine as seen by user, and of the interface. Further, in some embodiments some information is considered essential, or domain specific, and must be shared appropriately to promote transparency, relating to the second feature of the seven (7) teamwork or collaborative features—models and transparency feature.

Moreover, the collaborative, or cooperative, HMI is based on a common communication language and protocol enabling bi-directional communication, relating to the third feature of the seven (7) teamwork or collaborative features.

The automated behavior of the system will follow coordination algorithms, referenced in the fourth feature of the seven (7) teamwork or collaborative features, which assume existence of a model of the UTM and compute actions or decisions of the system (e.g. VATM) accordingly.

Further, the systems according to the present technology can be designed to be responsive to the needs, preferences, etc, of the UTM, toward being supportive of the UTM, such as when the UTM has input to be considered, an enquiry, or other need calling for explanation or other information, help, or assistance. This relates to the fifth feature of the seven (7) teamwork or collaborative features.

The design of the systems will promote sensitivity between the UTM and the machine to create a sense of intimacy between the two, relating to the sixth feature of the teamwork or collaborative features. For example, system pitch, intonation, and use of collaborative terminology or wording, such as "we" and "our" instead of "I" and "you," will be designed to create a team feeling, or collaborative environment.

And relating to the seventh teamwork or collaborative features, the system interacts with the user to promote acknowledgement and feedback about joint performance.

As also provided, the above-described computer-executable code or instructions are in various embodiments configured to consider, in forming and executing the algorithms and method of the present technology, any of a wide variety of these principles and concepts.

The concepts includes considerations originating in one or more of a variety of fields of thought, including social science (philosophy, sociology, social psychology), computer science, artificial intelligence, and human factors. The framework incorporates determinations of what defines a team, generally and essentially, and, more particularly, corresponding understandings of what defines good team interaction.

The concepts include data items corresponding to team properties, such as mutual support, mutual commitment, VATM transparency (e.g., as to machine state, behavior, control), user transparency (again regarding, e.g., state, intent, action), and responsiveness.

The team-based human-vehicle interface facilitates provision and request of feedback and help when it is desired by team member. The interface promotes the interaction being transparent, which allows the UTM to understand what the VATM is doing and why, and what the VATM may need, etc., and allows the VATM to sense UTM state, determine user preferences, etc.

The team-oriented interface is configured based in part on the UTM model, the VATM model, and VATM behavioral modules. Creating, updating, and maintaining models of the VATM and the UTM has at least a twofold purpose. The VATM is enabled to act best with relevant information about how the UTM behaves and thinks, such as by using data representing the model that the VATM has developed in working with the UTM. And the VATM can explain itself to its UTM, providing recommendations, inquiries, and reasons for actions, e.g., using a model of itself (VATM model) that can be interpreted easily by the human user team member (UTM). In these and other ways, the VATM can coordinate an effective team framework, as compared with the conventional automated framework involving supervisory models. And, in these ways, the team members (at least VATM and UTM) can together invested in achieving success in the cooperative mission, and in a smooth and efficient manner.

Considering differences in how machines and humans process data and function, a successful collaborative team including an automated machine agent and a human user agent, the team-oriented framework is configured to bring the team members together, on common ground, for working together toward shared team goals. It should not be assumed in the design or operation of the automated team member that the human user agent will operate like the automated team member, and the user agent cannot assume that the machine member will operate based on the same belief and behavior system that the user operates from.

As referenced, the collaborative framework is configured so that each team member will be attentive and responsive to group activity, the actions of the other team member(s), group processes for selecting a recipe, and assigning agents, or members, to constituent actions. And team members should be mutually directable. That is, policies can be enforced on teams to dynamically regulate behavior of the system in an external manner. Specifically, e.g., using such policies, the human agent team member can enforce bounds on the behavior of the automated agent. Feedback and attention can also be used to point respective members toward important signals, activities, changes, etc. Team members should also contribute to lowering a cost of coordinating their activities—e.g., the team members acting in the team framework improve efficiency of team operation.

Another important aspect of human-automation interaction is trust. For teams to work together there should be mutual trust between the human team member(s) and the machine agent team member.

VII. Outcomes, Advantages, and Benefits

Automated agent and human user teamwork reduces overall workload, due in large part to increased transparency, maintains high levels of situational awareness, due in large part to the collaborative interface approach, keeps the user agent in the control loop, especially due to the communication channels enabled by the team-oriented interface, and attains trust, due mostly to a reduction in uncertainty as a result of improved communications.

The present technology results in a variety of positive outcomes. The outcomes include a transparency of the vehicle agent team member to the user team member.

Another outcome is awareness of the existence, state, and actions of all team members.

Another outcome is an ability of the VATM to provide proactive, contextual, machine help to the UTM.

As another outcome, the framework facilitates bi-directional communication amongst team members and, thereby, promotes free sharing, requesting and provisioning, of information.

Advantages of the present technology include provision of a paradigm shift in the way vehicle agent team members interact with the users.

Another advantage of the technology is an enhanced user experience in working with the vehicle, reducing user annoyance and disorientation through the team experience.

Another advantage of the technology is an improvement of user-vehicle interactions by maintaining transparency and enabling proactive and reactive assistance.

Benefits of the present technology include enhancing user experience by maintaining long term relationships between a human user and the different automated systems in the car resulting from considering both systems and users as team members.

Benefits also include reducing user annoyance and confusion by supporting the user as an automated team member with the VATM that is aware of the user, and his/her needs and preferences.

The benefits also include improving vehicle system effectiveness via coordinated relationships with the user in order to increase user satisfaction and possibly increased use of the vehicle automation.

The benefits also include improving a vehicle-user interface and an integrated user experience.

The benefits also include improved vehicle effectiveness by increasing the usage of the systems and the satisfaction level of the user.

The benefits also include a graceful accommodation of users to a more natural interaction with the automation.

VII. Conclusion

Various embodiments of the present disclosure are disclosed herein.

The disclosed embodiments are merely examples that may be embodied in various and alternative forms, and combinations thereof.

The law does not require and it is economically prohibitive to illustrate and teach every possible embodiment of the present technology. Hence, the above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed is:

1. A heating, ventilation, and air-conditioning (HVAC) system, for use in a transportation vehicle having a vehicle window or sunroof and a vehicle cabin including vehicle-cabin zones, the HVAC system comprising:
   one or more HVAC hardware components selected from a group consisting of:
      a fan that, when actuated, blows air into the vehicle cabin;
      a compressor that, when actuated, defogs or defrosts the window;
      an air-source component that, when actuated, controls from which of multiple sources air flows into the HVAC system;
      a zone-section component that, when actuated, controls in which vehicle zone air is provided or conditioned;
      a window component that, when actuated, controls a degree by which the window or the sunroof of the transportation vehicle is open or closed to allow or block air external to the vehicle to enter/from entering the transportation vehicle;
      a humidity component that, when actuated, affects an amount of moisture in cabin air;
      a temperature component that, when actuated, directly affects a temperature or cabin air;
   a vehicle-sensor hardware device that, when operated:
      senses a physical quality indicating presence and identification of a person in the transportation vehicle; and
      generates a vehicle-sensor signal based on the physical quality sensed;
   a vehicle-user interface hardware device that, when operated:
      publishes notifications, rendering the notifications tangibly for consumption by a person being a vehicle operator; and
      receives a tangible vehicle-operator-agreement input and generate a vehicle-operator-agreement signal based on the tangible vehicle-operator-agreement input;
   a processing hardware-based device comprising:
      a processing unit connected in communication with the vehicle-sensor hardware device and the vehicle-user interface hardware device to perform system functions; and a non-transitory computer-readable storage device being in communication with the processing unit and comprising executable code that, when executed by the hardware-based processing unit, performs operations including:
- publishing, to render tangibly for vehicle operator consumption, using the vehicle-user interface hardware device, a vehicle-operator request notification requesting the vehicle operator to participate as a member of a collaborative heating, ventilation, and air-conditioning (HVAC) team, to include the HVAC system, in a relationship of cooperation regarding operating the HVAC system over time;
- publishing, to render tangibly for vehicle operator consumption, using the vehicle-user interface hardware device, a commitment notification advising the vehicle operator that the HVAC system would be dedicated to participating as a team member of the collaborative HVAC team;
- receiving, from the vehicle-user interface hardware device, the vehicle-operator-agreement signal by which the vehicle operator operating the transportation vehicle commits to participating as a vehicle-operator team member of the collaborative HVAC team;
- establishing, responsive to receiving the vehicle-operator-agreement signal, the collaborative HVAC team;
- receiving, from the vehicle-sensor hardware device, the vehicle-sensor signal indicating the physical quality;
- determining presence of a person in the transportation vehicle based on the vehicle-sensor signal indicating the physical quality;
- determining that the person present in the transportation vehicle is the vehicle-operator team member based on the vehicle-sensor signal indicating the physical quality;
- determining an HVAC action, to be effected by said one or more HVAC components of the system to change an environmental condition within the vehicle cabin, in response to determining that the person present in the transportation vehicle is the vehicle-operator team member; and
- physically actuating the one or more HVAC hardware components to implement the HVAC action determined, thereby changing the environmental condition within the vehicle cabin of the transportation vehicle.

2. The heating, ventilation, and air-conditioning system of claim 1, wherein the vehicle-operator request notification comprises a contract including multiple clauses referring to regular, active, and collaborative participation in activities of the collaborative HVAC team.

3. The heating, ventilation, and air-conditioning system of claim 1, wherein establishing the collaborative HVAC team includes establishing at least one model selected from a group consisting of:
- a user model, the user model being a representation, stored at the non-transitory computer-readable storage device of the processing hardware-based device, representing the vehicle operator operating the transportation vehicle, for use by the HVAC system in performing collaborative functions of the team;
- a machine model, the machine model being a representation, stored at the non-transitory computer-readable storage device of the processing hardware-based device, representing the HVAC system and its control logic, for use by the HVAC system in performing collaborative functions of the team;
- an interface model, the interface model, being stored at the non-transitory computer-readable storage device of the processing hardware-based device, relating to presentation of the HVAC system to the vehicle-operator team member, for use by the HVAC system in performing collaborative functions of the team; and
- a mental model, the mental model being a representation, stored at the non-transitory computer-readable storage device of the processing hardware-based device, representing a perspective of the HVAC system from a perspective of the vehicle-operator team member, for use by the HVAC system in performing collaborative functions of the team.

4. The heating, ventilation, and air-conditioning system of claim 1, wherein the code, when executed, establishes, subsequent to establishing the collaborative HVAC team, data items for use as inputs to an algorithm of the HVAC system for making team-based determinations during operation of the transportation vehicle.

5. The heating, ventilation, and air-conditioning system of claim 4, wherein the data items include vehicle-operator preferences.

6. The heating, ventilation, and air-conditioning system of claim 5, wherein at least one of the vehicle-operator preferences is a communication provided expressly to the processing hardware device by the vehicle operator and at least one of the vehicle-operator preferences is derived by the processing hardware device based on vehicle operator behavior.

7. The heating, ventilation, and air-conditioning system of claim 1, wherein:
- the code, when executed, receives a trigger, following identification of the vehicle-operator team member, triggering activation of a team-based HVAC function; and
- activating the team-based HVAC function is performed responsive to the trigger.

8. The heating, ventilation, and air-conditioning system of claim 7, wherein the team-based HVAC function includes pre-action-determination processing comprising collecting relevant data needed for making a determination on what HVAC action to take and/or how to perform the HVAC action.

9. The heating, ventilation, and air-conditioning system of claim 8, wherein:
- the team-based HVAC function includes providing a pre-action-determination communication; and
- the pre-action-determination communication is directed to an entity selected from a group consisting of:
  - the vehicle-operator team member;
  - a passenger of the transportation vehicle;
  - a remote party; and
  - a remote automated device.

10. The heating, ventilation, and air-conditioning system of claim 9, wherein the processing hardware device is configured to generate the pre-action-determination communication based on at least one characteristic selected from a group consisting of:
- a timing at which the pre-action-determination communication is provided;
- a tone in which the pre-action-determination communication is provided; and a substance of the pre-action-determination communication.

11. The heating, ventilation, and air-conditioning system of claim 8, wherein the team-based HVAC function includes determining the HVAC action based on data collected in the pre-action-determination processing according to a computational-decision-making algorithm embodied in computer-executable instructions stored at a non-transitory storage unit of the processing hardware device.

12. The heating, ventilation, and air-conditioning system of claim 11, wherein:
the HVAC action comprises transferring control of an HVAC task, either from automatic system control to user manual control, or from user manual control to automatic system control; and
the processing hardware device is further configured to transfer the control in a predetermined manner based on at least one characteristic selected from a group consisting of:
a timing at which the control is transferred; and
a manner by which the control is transferred.

13. The heating, ventilation, and air-conditioning system of claim 11, wherein:
the team-based HVAC function further includes performing post-action processing; and
the post-action processing includes establishing, in response to express or inferred concurrence to a determination basis associated with a scenario, the determination basis as a rule for automatic future use in a same or similar scenario.

14. The heating, ventilation, and air-conditioning system of claim 11, wherein:
the team-based HVAC function further includes generating a post-action communication; and
the post-action communication is directed to an entity selected from a group consisting of:
the vehicle-operator team member;
a passenger of the transportation vehicle;
a remote party; and
a remote automated device.

15. The heating, ventilation, and air-conditioning system of claim 14, wherein the processing hardware device is further configured to generate the post-action communication to have a characteristic selected from a group consisting of:
a timing at which the post-action communication is provided;
a tone in which the post-action communication is provided; and
a substance of the post-action communication.

16. The heating, ventilation, and air-conditioning system of claim 1, wherein:
the request is a first request and the vehicle-operator-agreement signal is a first vehicle-operator-agreement signal;
the processing hardware device is further configured to:
communicate, to another entity, a second request to participate as a member of the collaborative HVAC team, to include the HVAC system and the vehicle-operator team member, in a relationship of cooperation regarding operating the HVAC system over time;
provide, to the other entity, the commitment notification advising the other entity that the HVAC system is dedicated to participating as another member of the collaborative HVAC team; and
receive, from the other entity, a second vehicle-operator-agreement signal by which the vehicle operator operating the transportation vehicle commits to participating as the other member of the collaborative HVAC team; and
establishing the collaborative HVAC team comprises establishing, responsive to receiving the second vehicle-operator-agreement signal, the other entity as the other member of the collaborative HVAC team.

17. The heating, ventilation, and air-conditioning system of claim 1, wherein:
the HVAC system maintains a pre-determined level of system control vis-à-vis user team member control; and
the HVAC system includes or is connected in communication with a hardware-based selector device by which the user team member can control the level.

18. The heating, ventilation, and air-conditioning system of claim 1, wherein the processing hardware device is further configured to publish, to render tangibly for vehicle operator consumption, using the vehicle-user interface hardware device, a recommended HVAC-action notification indicating a proposed change to an environmental condition within the vehicle cabin.

19. The heating, ventilation, and air-conditioning system of claim 18, wherein the operations further comprise:
determining that the vehicle-operator team member has acquiesced to a recommended HVAC action of the recommended HVAC-action notification to change the environmental condition within the cabin of the transportation vehicle; and
implementing the HVAC action, to change the environmental condition within the cabin of the transportation vehicle, is performed in response to determining that the vehicle-operator team member has acquiesced to the recommended HVAC action.

20. The heating, ventilation, and air-conditioning system of claim 18, wherein the processing hardware device is further configured to publish, to render tangibly for vehicle operator consumption, using the vehicle-user interface hardware device, a recommended HVAC-action notification indicating a proposed change to an environmental condition within the vehicle cabin.

21. The heating, ventilation, and air-conditioning system of claim 20, wherein:
the processing hardware device is further configured to determine that the vehicle-operator team member has acquiesced to a recommended HVAC action of the recommended HVAC-action notification to change the environmental condition within the cabin of the transportation vehicle; and
implementing the HVAC action, to change the environmental condition within the cabin of the transportation vehicle, is performed in response to determining that the vehicle-operator team member has acquiesced to the recommended HVAC action.

22. The heating, ventilation, and air-conditioning system of claim 1, wherein the processing hardware device is further configured to publish, to render tangibly for vehicle operator consumption, using the vehicle-user interface hardware device, a recommended HVAC-action notification indicating a proposed change to an environmental condition within the vehicle cabin.

23. The heating, ventilation, and air-conditioning system of claim 22, wherein:
the processing hardware device is further configured to determine that the vehicle-operator team member has acquiesced to a recommended HVAC action of the recommended HVAC-action notification to change the environmental condition within the cabin of the transportation vehicle; and implementing the HVAC action, to change the environmental condition within the cabin of the transportation vehicle, is performed in response to determining that the vehicle-operator team member has acquiesced to the recommended HVAC action.

24. A heating, ventilation, and air-conditioning (HVAC) system, for use in a transportation vehicle having a vehicle cabin, the HVAC system comprising:

one or more HVAC hardware components;

a vehicle-sensor hardware device that, when operated:
  senses a physical quality indicating presence and identification of a person in the transportation vehicle; and
  generates a vehicle-sensor signal based on the physical quality sensed;

a vehicle-user interface hardware device that, when operated:
  publishes notifications, rendering the notifications tangibly for consumption by a person being a vehicle operator; and
  receives a tangible vehicle-operator-agreement input and generate a vehicle-operator-agreement signal based on the tangible vehicle-operator-agreement input;

a processing hardware-based device comprising:
  a processing unit connected in communication with the vehicle-sensor hardware device and the vehicle-user interface hardware device to perform system functions, and
  a non-transitory computer-readable storage device being in communication with the processing unit and comprising executable code that, when executed by the hardware-based processing unit, performs operations including:
    publishing, to render tangibly for vehicle operator consumption, using the vehicle-user interface hardware device, a vehicle-operator request notification requesting the vehicle operator to participate as a member of a collaborative heating, ventilation, and air-conditioning (HVAC) team, to include the HVAC system, in a relationship of cooperation regarding operating the HVAC system over time;
    publishing, to render tangibly for vehicle operator consumption, using the vehicle-user interface hardware device, a commitment notification advising the vehicle operator that the HVAC system would be dedicated to participating as a team member of the collaborative HVAC team;
    receiving, from the vehicle-user interface hardware device, the vehicle-operator-agreement signal by which the vehicle operator operating the transportation vehicle commits to participating as a vehicle-operator team member of the collaborative HVAC team;
    establishing, responsive to receiving the vehicle-operator-agreement signal, the collaborative HVAC team;
    receiving, from the vehicle-sensor hardware device, the vehicle-sensor signal indicating the physical quality;
    determining presence of a person in the transportation vehicle based on the vehicle-sensor signal indicating the physical quality;
    determining that the person present in the transportation vehicle is the vehicle-operator team member based on the vehicle-sensor signal indicating the physical quality;
    determining an HVAC action, to be effected by said one or more HVAC components of the system to change an environmental condition within the vehicle cabin, in response to determining that the person present in the transportation vehicle is the vehicle-operator team member; and
    physically actuating the one or more HVAC hardware components to implement the HVAC action determined, thereby changing the environmental condition within the vehicle cabin of the transportation vehicle.

25. A heating, ventilation, and air-conditioning (HVAC) system, for use in a transportation vehicle having a vehicle cabin, the HVAC system comprising:

one or more HVAC hardware components;

a vehicle-sensor hardware device that, when operated:
  senses a physical quality indicating presence and identification of a person in the transportation vehicle; and
  generates a vehicle-sensor signal based on the physical quality sensed;

a vehicle-user interface hardware device that, when operated:
  publishes notifications, rendering the notifications tangibly for consumption by a person being a vehicle operator; and
  receives a tangible vehicle-operator-agreement input and generate a vehicle-operator-agreement signal based on the tangible vehicle-operator-agreement input;

a processing hardware-based device comprising:
  a processing unit connected in communication with the vehicle-sensor hardware device and the vehicle-user interface hardware device to perform system functions, and
  a non-transitory computer-readable storage device being in communication with the processing unit and comprising executable code that, when executed by the hardware-based processing unit, performs operations including:
    publishing, to render tangibly for vehicle operator consumption, using the vehicle-user interface hardware device, a vehicle-operator request notification requesting the vehicle operator to participate as a member of a collaborative heating, ventilation, and air-conditioning (HVAC) team, to include the HVAC system, in a relationship of cooperation regarding operating the HVAC system over time;
    publishing, to render tangibly for vehicle operator consumption, using the vehicle-user interface hardware device, a commitment notification advising the vehicle operator that the HVAC system would be dedicated to participating as a team member of the collaborative HVAC team;
    receiving, from the vehicle-user interface hardware device, the vehicle-operator-agreement signal by which the vehicle operator operating the transportation vehicle commits to participating as a vehicle-operator team member of the collaborative HVAC team;

establishing, responsive to receiving the vehicle-operator-agreement signal, the collaborative HVAC team;

determining presence of a person in the transportation vehicle based on the vehicle-sensor signal indicating the physical quality;

determining that the person present in the transportation vehicle is the vehicle-operator team member based on the vehicle-sensor signal indicating the physical quality;

determining an HVAC action, to be effected by said one or more HVAC components of the system to change an environmental condition within the vehicle cabin, in response to determining that the person present in the transportation vehicle is the vehicle-operator team member; and physically actuating the one or more HVAC hardware components to implement the HVAC action determined, thereby changing the environmental condition within the vehicle cabin of the transportation vehicle.

* * * * *